US012684239B2

(12) United States Patent (10) Patent No.: US 12,684,239 B2
Yamakabe et al. (45) Date of Patent: Jul. 14, 2026

(54) IMAGING SYSTEM, IMAGING APPARATUS, IMAGING METHOD, AND NON-TRANSITORY RECORDING MEDIUM

(71) Applicant: NEC Corporation, Tokyo (JP)

(72) Inventors: Ryo Yamakabe, Tokyo (JP); Kosuke Yoshimi, Tokyo (JP); Yuka Ogino, Tokyo (JP); Ryuichi Akashi, Tokyo (JP); Masato Tsukada, Tokyo (JP); Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 18/722,700

(22) PCT Filed: Dec. 28, 2021

(86) PCT No.: PCT/JP2021/048870
§ 371 (c)(1),
(2) Date: Jun. 21, 2024

(87) PCT Pub. No.: WO2023/127124
PCT Pub. Date: Jul. 6, 2023

(65) Prior Publication Data
US 2025/0080853 A1 Mar. 6, 2025

(51) Int. Cl.
*H04N 23/695* (2023.01)
*H04N 23/72* (2023.01)
(52) U.S. Cl.
CPC .......... *H04N 23/695* (2023.01); *H04N 23/72* (2023.01)
(58) Field of Classification Search
CPC ....... H04N 23/695; H04N 23/23; H04N 23/72

USPC ......................................................... 348/169
See application file for complete search history.

(56) References Cited

U.S. PATENT DOCUMENTS

2002/0191076 A1* 12/2002 Wada ..................... G06V 40/19
348/78
2006/0115116 A1* 6/2006 Iwasaki .................. G06V 40/25
382/218
2013/0182915 A1* 7/2013 Hanna ..................... G06F 21/32
382/116

(Continued)

FOREIGN PATENT DOCUMENTS

JP 2006-163683 A 6/2006
JP 2010-172394 A 8/2010

(Continued)

OTHER PUBLICATIONS

International Search Report for PCT Application No. PCT/JP2021/048870, mailed on Mar. 15, 2022.

(Continued)

*Primary Examiner* — Rebecca A Volentine
*Assistant Examiner* — Jimmy S Lee
(74) *Attorney, Agent, or Firm* — Sughrue Mion, PLLC

(57) ABSTRACT

An imaging system includes: an information acquisition unit that acquires movement information about a movement of at least a part of a target; a periodicity estimation unit that estimates periodicity about the movement of at least a part of the target, on the basis of the movement information; and an image acquisition unit that controls a camera for imaging the target on the basis of the periodicity and acquires an image of the target. According to such an imaging system, it is possible to properly image a moving target.

11 Claims, 32 Drawing Sheets

(56) References Cited

U.S. PATENT DOCUMENTS

| | | | | |
|---|---|---|---|---|
| 2015/0288923 A1* | 10/2015 | Kim | ...................... | H04N 23/62 |
| | | | | 348/14.05 |
| 2018/0262687 A1* | 9/2018 | Hildreth | ............... | H04N 13/204 |
| 2019/0306409 A1* | 10/2019 | Taki | ..................... | H04N 23/695 |
| 2021/0390353 A1 | 12/2021 | Futatsugi et al. | | |
| 2022/0166921 A1 | 5/2022 | Ogino et al. | | |
| 2023/0171500 A1 | 6/2023 | Ogino et al. | | |

FOREIGN PATENT DOCUMENTS

| | | | |
|---|---|---|---|
| JP | 2016-004446 A | 1/2016 |
| JP | 2017-127522 A | 7/2017 |
| JP | 2019-186911 A | 10/2019 |
| JP | 2020-107145 A | 7/2020 |
| JP | 2021-058300 A | 4/2021 |
| JP | 2021-176219 A | 11/2021 |
| WO | 2020/090251 A1 | 5/2020 |
| WO | 2020/195215 A1 | 10/2020 |
| WO | 2021/229761 A1 | 11/2021 |

OTHER PUBLICATIONS

JP Office Communication for JP Application No. 2022-029796, mailed on Apr. 11, 2023.

* cited by examiner

S101

S102

S103

WHEN MIRROR IS
ROTATED, IMAGING
RANGE IS CHANGED

300

18

EYE POSITION
SIGNIFICANTLY
CHANGES AT
UPWARD STEP

EYE POSITION
GRADUALLY
CHANGES ON
UPWARD SLOPE
BEFORE GATE

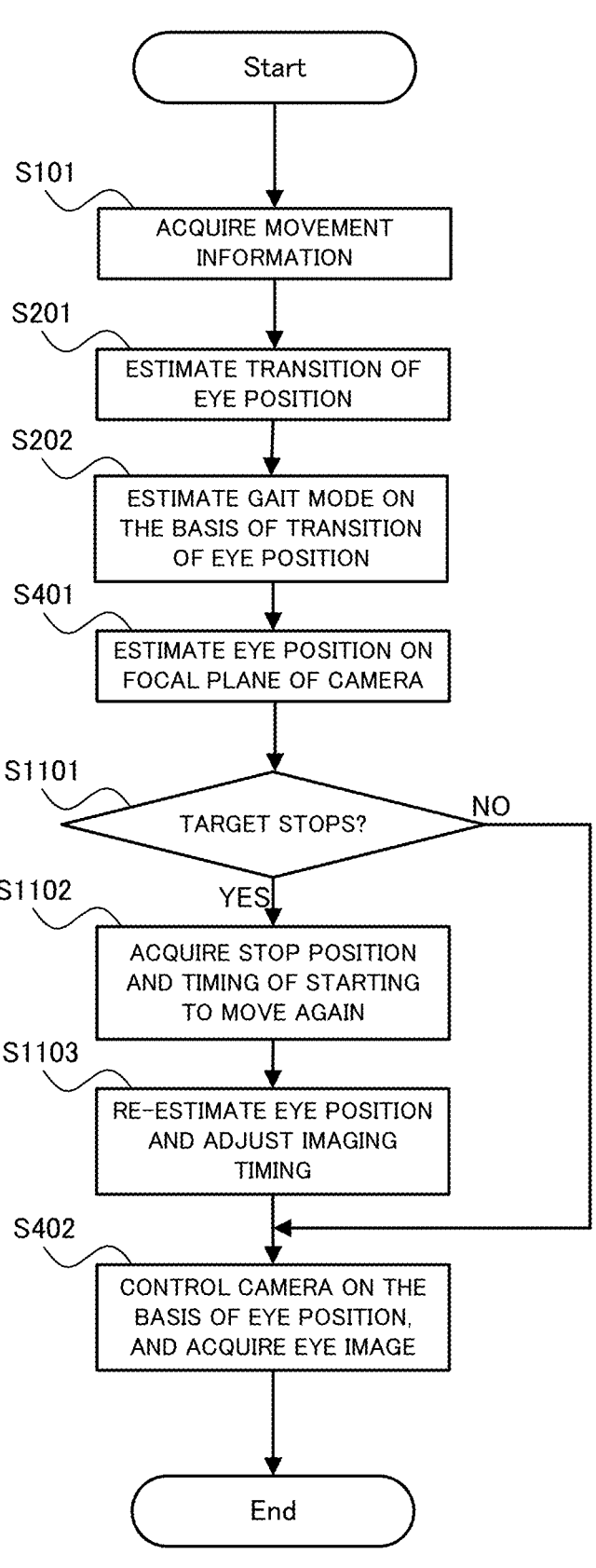

S101

ACQUIRE MOVEMENT
INFORMATION

S201

ESTIMATE TRANSITION OF
EYE POSITION

S202

ESTIMATE GAIT MODE ON
THE BASIS OF TRANSITION
OF EYE POSITION

S401

ESTIMATE EYE POSITION ON
FOCAL PLANE OF CAMERA

S1101

TARGET STOPS?    NO

S1102    YES

ACQUIRE STOP POSITION
AND TIMING OF STARTING
TO MOVE AGAIN

S1103

RE-ESTIMATE EYE POSITION
AND ADJUST IMAGING
TIMING

S402

CONTROL CAMERA ON THE
BASIS OF EYE POSITION,
AND ACQUIRE EYE IMAGE

FIG. 28

IMAGING SYSTEM, IMAGING APPARATUS, IMAGING METHOD, AND NON-TRANSITORY RECORDING MEDIUM

This application is a National Stage Entry of PCT/JP2021/048870 filed on Dec. 28, 2021, the contents of all of which are incorporated herein by reference, in their entirety.

TECHNICAL FIELD

This disclosure relates to technical fields of an imaging system, an imaging apparatus, an imaging method, and a recording medium.

BACKGROUND ART

A known system of this type images a part of a living body (e.g., a face, an iris, etc.) used for biometric authentication processing. For example, Patent Literature 1 discloses that, in a walk-through type iris recognition, a camera is selected in accordance with a height of an authenticated person, and that a position of the authenticated person is estimated on the basis of a size of the face or the like. Patent Literature 2 discloses that gait information (stride length, swinging of arms and legs, posture, walking cycle, asymmetry of movement, etc.) is extracted from a plurality of cameras and is compared with gait information about a target person, thereby performing gait recognition. Patent Literature 3 discloses that a total gait evaluation value is calculated from feature quantities of acceleration, walking power, walking pace, and walking balance of a user. Patent Literature 4 discloses that a distance to a target is calculated from a distance between a right eye and a left eye, and that an eye level of an authenticated person is calculated to tilt a camera.

CITATION LIST

Patent Literature

Patent Literature 1: International Publication No. WO2020/195215
Patent Literature 2: JP2020-107145A
Patent Literature 3: JP2017-127522A
Patent Literature 4: JP2006-163683A

SUMMARY

Technical Problem

This disclosure aims to improve the techniques/technologies disclosed in Citation List.

Solution to Problem

An imaging system according to an example aspect of this disclosure includes: an information acquisition unit that acquires movement information about a movement of at least a part of a target; a periodicity estimation unit that estimates periodicity about the movement of at least a part of the target, on the basis of the movement information; and an image acquisition unit that controls a camera for imaging the target on the basis of the periodicity and acquires an image of the target.

An imaging apparatus according to an example aspect of this disclosure includes: an information acquisition unit that acquires movement information about a movement of at least a part of a target; a periodicity estimation unit that estimates periodicity about the movement of at least a part of the target, on the basis of the movement information; and an image acquisition unit that controls a camera for imaging the target on the basis of the periodicity and acquires an image of the target.

An imaging method according to an example aspect of this disclosure is an imaging method that is executed by at least one computer, the imaging method including: acquiring movement information about a movement of at least a part of a target; estimating periodicity about the movement of at least a part of the target, on the basis of the movement information; and controlling a camera for imaging the target on the basis of the periodicity and acquiring an image of the target.

A recording medium according to an example aspect of this disclosure is a recording medium on which a computer program that allows at least one computer to execute an imaging method is recorded, the imaging method including: acquiring movement information about a movement of at least a part of a target; estimating periodicity about the movement of at least a part of the target, on the basis of the movement information; and controlling a camera for imaging the target on the basis of the periodicity and acquiring an image of the target.

BRIEF DESCRIPTION OF DRAWINGS

FIG. 28 is a flowchart illustrating a flow of operation of an imaging system according to a twelfth example embodiment.

DESCRIPTION OF EXAMPLE EMBODIMENTS

Hereinafter, an imaging system, an imaging apparatus, an imaging method, and a recording medium according to example embodiments will be described with reference to the drawings.

First Example Embodiment

An imaging system according to a first example embodiment will be described with reference to FIG. 1 to FIG. 3.
(Hardware Configuration)

First, with reference to FIG. 1, a hardware configuration of the imaging system according to the first example embodiment will be described. FIG. 1 is a block diagram illustrating the hardware configuration of the imaging system according to the first example embodiment.

Figure 1:
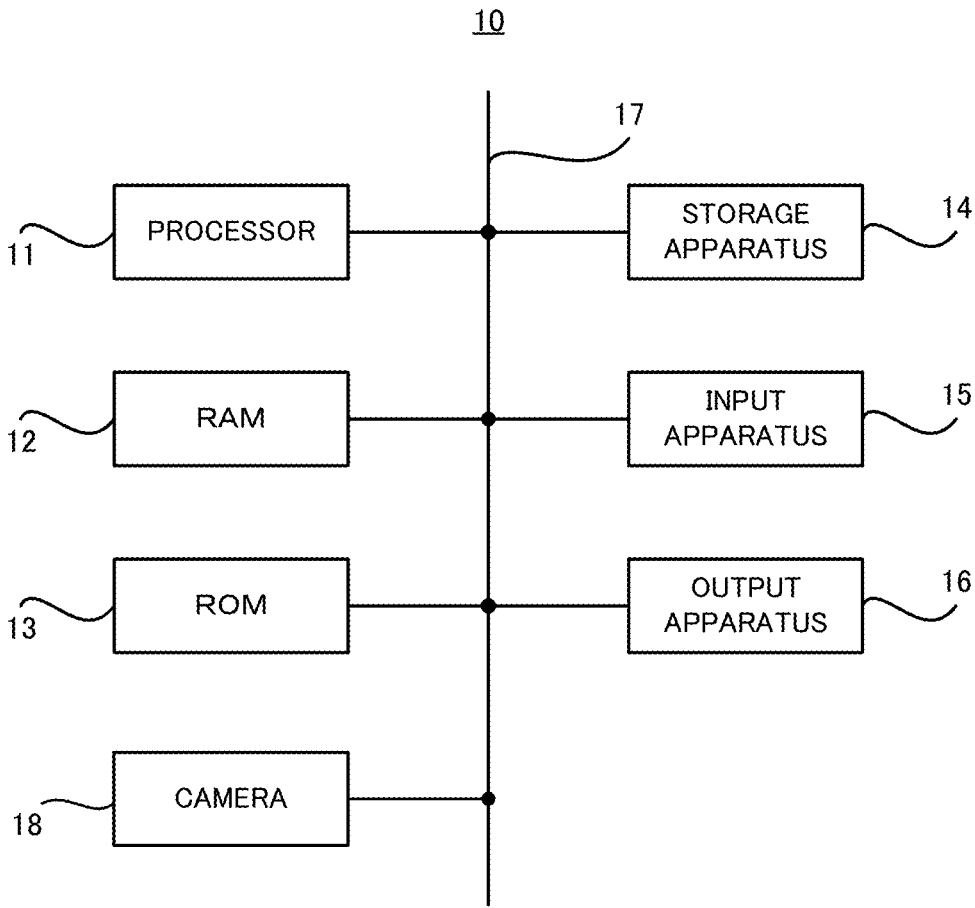
FIG. 1 is a block diagram illustrating a hardware configuration of an imaging system according to a first example embodiment.

As illustrated in FIG. 1, an imaging system 10 according to the first example embodiment includes a processor 11, a RAM (Random Access Memory) 12, a ROM (Read Only Memory) 13, and a storage apparatus 14. The imaging system 10 may further include an input apparatus 15 and an output apparatus 16. The imaging system 10 also includes a camera 18. The processor 11, the RAM 12, the ROM 13, the storage apparatus 14, the input apparatus 15, the output apparatus 16, and the cameras 18 are connected through a data bus 17.

The processor 11 reads a computer program. For example, the processor 11 is configured to read a computer program stored by at least one of the RAM 12, the ROM 13, and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the imaging system 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for performing processing for capturing an image of a target, is realized in the processor 11. That is, the processor 11 may function as a controller for executing each control in the imaging system 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores the data that are temporarily used by the processor 11 when the processor 11 executes the computer program. The RAM 12 may be, for example, a D-RAM (Dynamic Random Access Memory) or a SRAM (Static Random Access Memory). Furthermore, another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Furthermore, another type of nonvolatile memory may also be used instead of the ROM 13.

The storage apparatus 14 stores the data that are stored by the imaging system 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the imaging system 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the imaging system 10 to the outside. For example, the output apparatus 16 may be a display apparatus (e.g., a display) that is configured to display the information about the imaging system 10. The output apparatus 16 may be a speaker or the like that is configured to audio-output the information about the imaging system 10. The output appa-ratus 16 may be configured as a portable terminal such as a smartphone and a tablet. The output apparatus 16 may be an apparatus that outputs information in a format other than an image. For example, the output apparatus 16 may be a speaker that audio-outputs the information about the imag-ing system 10.

The camera 18 is a camera mounted at a position where the image of the target can be captured. The target here is not limited to a human being, but may include an animal such as a dog, a snake, a robot, or the like. The camera 18 may capture a whole image of the target, or may image a part of the target. For example, the camera 18 may be configured to capture an image of a face of the target (hereinafter referred to as a "face image" as appropriate) and an image including an eye of the target (hereinafter referred to as an "eye image"). The camera 18 may be a camera that captures a still image, or a camera that captures a video. The camera 18 may be configured as a visible light camera or as a near infrared camera. A plurality of cameras 18 may be provided. The plurality of cameras 18 may be of the same type, or may be of different types. For example, the camera 18 may have a function of automatically turning off in a case where the camera 19 does not capture an image. In this case, for example, a part having a short life such as a liquid lens and a motor, may be preferentially turned off.

Although FIG. 1 illustrates an example of the imaging system 10 including a plurality of apparatuses, all or a part of the functions thereof may be realized or implemented with a single apparatus (imaging apparatus). For example, the imaging apparatus may include only the processor 11, the RAM 12, and the ROM 13, and the other components (i.e., the storage apparatus 14, the input apparatus 15, the output apparatus 16, and the camera 18) may be provided in an external apparatus connected to the imaging apparatus, for example. In addition, in the imaging apparatus, a part of an arithmetic function may be realized by an external apparatus (e.g., an external server or cloud, etc.).

(Functional Configuration)

Next, with reference to FIG. 2, a functional configuration of the imaging system 10 according to the first example embodiment will be described. FIG. 2 is a block diagram illustrating the functional configuration of the imaging sys-tem according to the first example embodiment.

The imaging system 10 according to the first example embodiment is configured to capture the image of the target. More specifically, the imaging system 10 is configured to image a moving target (e.g., a pedestrian, etc.). The appli-cation of the image captured by the imaging system 10 is not particularly limited, but the image may be used in biometric authentication, for example. For example, the imaging sys-tem 10 may be configured as a part of an authentication system that performs walk-through authentication in which a walking target is imaged to perform the biometric authen-tication.

Figure 2:
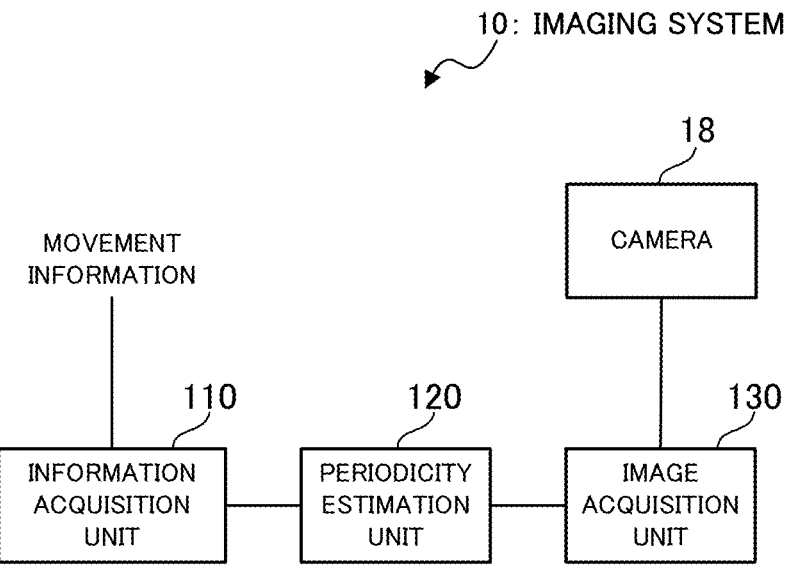
FIG. 2 is a block diagram illustrating a functional configuration of the imaging system according to the first example embodiment.

As illustrated in FIG. 2, the imaging system 10 according to the first example embodiment includes, as components for realizing the functions thereof, the camera 18 already described, an information acquisition unit 110, a periodicity estimation unit 120, and an image acquisition unit 130. Each of the information acquisition unit 110, the periodicity estimation unit 120, and the image acquisition unit 130 may be a processing block realized or implemented by the processor 11 (see FIG. 1), for example.

The information acquisition unit 110 is configured to acquire movement information about a movement of at least a part of the target. At least a part of the target is, for example, a part that makes a periodic movement when the target moves, and may be the eyes, a whole face, a nose, a mouth, ears, arms, a chest, legs/feet, a whole body, or the like, for example. The movement information may be vari-ous types of information about the movement, and may include a plurality of types of information. The type of information included in the movement information is not particularly limited as long as it is about to the movement, but may be information indicating a transition of a position (time-series coordinate information, etc.), for example. Alternatively, the movement information may include infor-mation about moving velocity, acceleration, or the like. The information acquisition unit 110 may acquire the movement information by using various sensors, for example. The information acquisition unit 110 may acquire the movement information by using the camera 18. The information acqui-sition unit 110 may acquire information other than the movement information. The information other than the movement information acquired by the information acqui-sition unit 110 will be described in detail in another example embodiment later.

The periodicity estimation unit 120 is configured to estimate periodicity about the movement of at least a part of the target, on the basis of the movement information acquired by the information acquisition unit 110. The "peri-odicity" herein is information indicating a period of the movement repeated by at least a part of the target. The estimated periodicity may be a value indicating the period itself, or may be a graph or another type of information indicating the periodicity. The periodicity estimation unit 120 may estimate the periodicity by using a preset rule. Alternatively, the periodicity estimation unit 120 may esti-mate the periodicity by using a learned/trained estimation model. A specific example of the periodicity estimated by the periodicity estimation unit 120 will be described in detail in another example embodiment later.

The image acquisition unit 130 is configured to control the camera 18 on the basis of the periodicity estimated by the periodicity estimation unit 120 and to acquire the image of the target. For example, the image acquisition unit 130 controls a direction and a position of the camera, a camera parameter, imaging timing, and the like, in order to acquire a more appropriate image. The image acquisition unit 130 may also control an element that may affect the imaging (e.g., may control lighting, etc.), in addition to controlling the camera 18. The image acquisition unit 130 may also perform control for outputting guidance information serving as a prompt for the target to move. Specifically, the image acquisition unit 130 may control an output unit capable of outputting various types of information by using a display, a speaker, or the like, and may output the guidance infor-mation for the user (e.g., information serving as a prompt for the user to move) as appropriate. The image acquisition unit 130 may control the output unit to output a message such as "Please just walk through" in a case where there is a user who makes a non-periodical movement, such as stopping in front of the camera 18, for example. A specific control method by the image acquisition unit 130 will be described in detail in another example embodiment later.

(Flow of Operation)

Next, with reference to FIG. 3, a flow of operation of the imaging system 10 according to the first example embodi-ment (i.e., an operation when the image of the target is captured) will be described. FIG. 3 is a flowchart illustrating the flow of the operation of the imaging system according to the first example embodiment.

Figure 3:
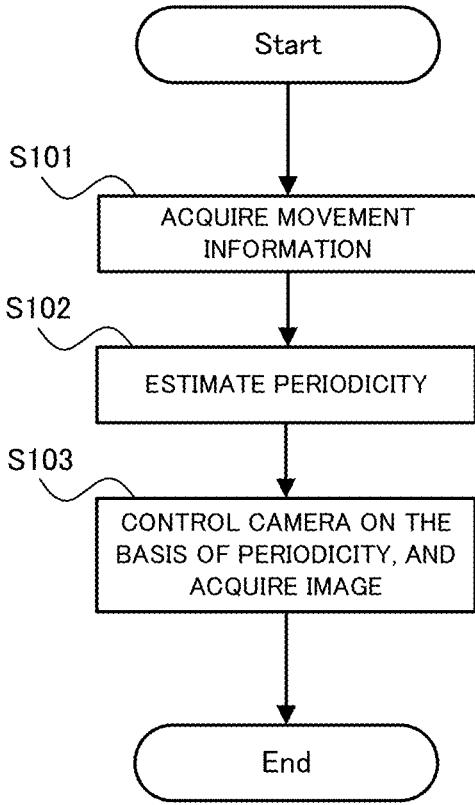
FIG. 3 is a flowchart illustrating a flow of operation of the imaging system according to the first example embodiment.

As illustrated in FIG. 3, when the operation of the imaging system 10 according to the first example embodiment is started, first, the information acquisition unit 110 acquires the movement information about the movement of at least a part of the target (step S101). The information acquisition unit 110 outputs the acquired movement information to the periodicity estimation unit 120.

Subsequently, the periodicity estimation unit 120 estimates the periodicity about the movement of at least a part of the target, on the basis of the movement information acquired by the information acquisition unit 110 (step S102). The periodicity estimation unit 120 outputs information about the estimated periodicity to the image acquisition unit 130.

Subsequently, the image acquisition unit 130 controls the camera 18 on the basis of the periodicity estimated by the periodicity estimation unit 120, and acquires the image of the target (step S103). The image acquisition unit 130 may output the acquired image to a display or the like. The image acquisition unit 130 may control the separately provided output unit to output the acquired image.

(Technical Effect)

Next, a technical effect obtained by the imaging system 10 according to the first example embodiment will be described.

As described in FIG. 1 to FIG. 3, in the imaging system 10 according to the first example embodiment, the camera 18 is controlled on the basis of the periodicity about the movement of the target. In this way, it is possible to perform the imaging in consideration of the movement of the target, and it is thus possible to image the target image in a more appropriate state and to acquire a more appropriate image.

Second Example Embodiment

The imaging system 10 according to a second example embodiment will be described with reference to FIG. 4. The second example embodiment is partially different from the first example embodiment only in the operation, and may be the same as those of the first example embodiment in the other parts. For this reason, a part that is different from the first example embodiment described above will be described in detail below, and a description of other overlapping parts will be omitted as appropriate.

(Flow of Operation)

First, with reference to FIG. 4, a flow of operation of the imaging system 10 according to the second example embodiment will be described. FIG. 4 is a flowchart illustrating the flow of the operation of the imaging system according to the second example embodiment. In FIG. 4, the same steps as those illustrated in FIG. 3 carry the same reference numerals.

Figure 4:
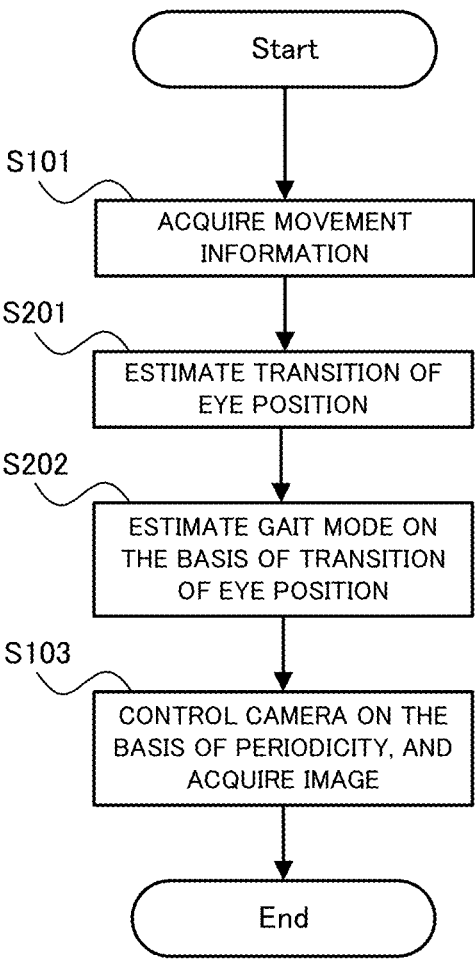
FIG. 4 is a flowchart illustrating a flow of operation of an imaging system according to a second example embodiment.

As illustrated in FIG. 4, when the operation of the imaging system 10 according to the second example embodiment is started, first, the information acquisition unit 110 acquires the movement information about the movement of at least a part of the target (step S101). The information acquisition unit 110 according to the second example embodiment acquires at least the movement information about the movement of the eyes of the target.

Subsequently, the periodicity estimation unit 120 estimates a transition of an eye position on the basis of the movement information acquired by the information acquisition unit 110 (step S201). Then, the periodicity estimation unit 120 estimates a gait model on the basis of the transition of the eye position (step S202). The "gait model" herein is a model indicating a gait of the target, and includes information about the periodicity. The gait model may be, for example, information indicating how the position of the eyes changes in accordance with walking of the target (i.e., information indicating the periodicity of eye movement in accordance with the walking). The periodicity estimation unit 120 may estimate the periodicity by using the estimated gait model.

The gait model may be, for example, a model expressed as the following equation (1).

$$y = A\sin\{(2\pi/T)t + \alpha\} + \beta \tag{1}$$

where y is an eye level, A is an amplitude, T is a period, t is a time, and $\alpha$ and $\beta$ are predetermined coefficients.

Subsequently, the image acquisition unit 130 controls the camera 18 on the basis of the periodicity (i.e., the periodicity indicated by the gait model) estimated by the periodicity estimation unit 120, and acquires the image of the target (step S103). The control of the camera 18 based on the gait model will be described in detail in another example embodiment later.

(Technical Effect)

Next, a technical effect obtained by the imaging system 10 according to the second example embodiment will be described.

As illustrated in FIG. 4, in the imaging system 10 according to the second example embodiment, the gait model may be estimated on the basis of the transition of the eye position, and the periodicity of the target may be estimated. In this way, it is possible to perform more appropriate imaging in consideration of the gait of the target.

Third Example Embodiment

The imaging system 10 according to a third example embodiment will be described with reference to FIG. 5 and FIG. 6. The third example embodiment is partially different from the first and second example embodiments only in the configuration and operation, and may be the same as the first and second example embodiments in the other parts. For this reason, a part that is different from each of the example embodiments described above will be described in detail below, and a description of other overlapping parts will be omitted as appropriate.

(Functional Configuration)

First, with reference to FIG. 5, a functional configuration of the imaging system 10 according to the third example embodiment will be described. FIG. 5 is a block diagram illustrating the functional configuration of the imaging system according to the third example embodiment. In FIG. 5, the same elements as those illustrated in FIG. 2 carry the same reference numerals.

Figure 5:
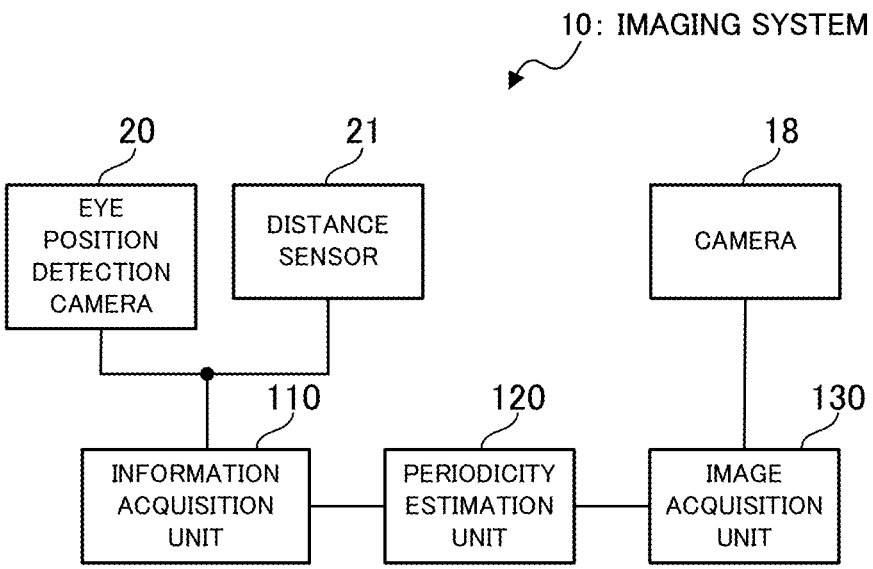
FIG. 5 is a block diagram illustrating a functional configuration of an imaging system according to a third example embodiment.

As illustrated in FIG. 5, the imaging system 10 according to the third example embodiment includes, as components for realizing the functions thereof, the camera 18, an eye position detection camera 20, a distance sensor 21, the information acquisition unit 110, the periodicity estimation unit 120, and the image acquisition unit 130. That is, the imaging system 10 according to the third example embodiment further includes the eye position detection camera 20 and the distance sensor 21, in addition to the configuration in the first example embodiment (see FIG. 2).

The eye position detection camera 20 is a camera configured to detect the eye position of the target. The eye position detection camera 20 is configured to capture an image including the eyes pf the target and to detect the eye position of the target from the image. The eye position detection camera 20 may be configured to detect the transition of the eye position by continuously capturing images. A detailed descript of a specific method of detecting the eye position from the image is omitted here, as the existing technologies/techniques may be applied accordingly. The eye position detection camera 20 may be provided as a different camera from the camera 18, or may be provided as the same camera as the camera 18. For example, in a case where the camera 18 has a function of detecting the eye position, the camera 18 may be used as the eye position detection camera 20. Information about the eye position detected by the eye position detection camera 20, is configured to be acquired by the information acquisition unit 110 as the movement information about the eyes.

The distance sensor 21 is configured to detect a distance between the target and the eye position detection camera 20. The distance between the target and the eye position detection camera 20 acquired by the distance sensor 21, is configured to be acquired by the information acquisition unit 110 together with the movement information about the eyes.

(Coordinate Conversion Operation)

Next, with reference to FIG. 6, a coordinate conversion operation performed by the imaging system 10 according to the third example embodiment will be described. FIG. 6 is a conceptual diagram illustrating a coordinate conversion operation by the imaging system according to the third example embodiment.

Figure 6:
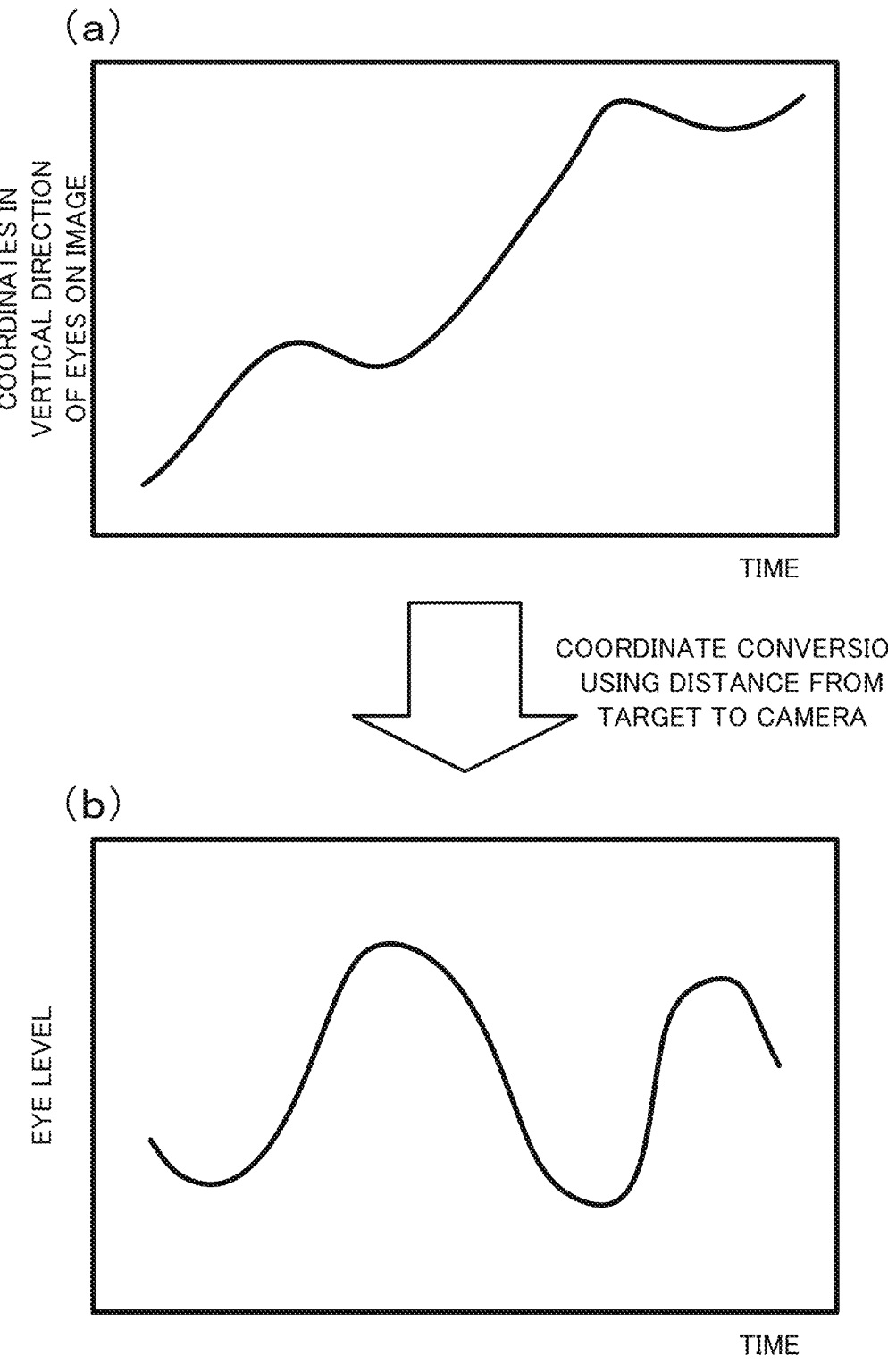
FIG. 6 is a conceptual diagram illustrating a coordinate conversion operation by the imaging system according to the third example embodiment.

As illustrated in FIG. 6(*a*), in the imaging system 10 according to the third example embodiment, the information acquisition unit 110 acquires the transition of the eye position of the target from the eye position detection camera 20. The transition of the eye position here is acquired from the image, and is thus represented by coordinates of the eyes on the image. That is, the transition of the eye position acquired by the information acquisition unit 110 is the transition of the eye position in a two-dimensional plane.

As illustrated in FIG. 6(*b*), the periodicity estimation unit 120 according to the third example embodiment converts/transforms the transition of the eye position in the two-dimensional plane to the transition of the eye position in a three-dimensional space. Specifically, the periodicity estimation unit 120 converts the transition of the eye position in the two-dimensional plane to the transition of the eye position in the three-dimensional space, by using the distance between the target and the eye position detection camera 20 acquired by the distance sensor 21, as depth information.

(Technical Effect)

Next, a technical effect obtained by the imaging system 10 according to the third example embodiment will be described.

As described in FIG. 5 and FIG. 6, in the imaging system 10 according to the third example embodiment, the transition of the eye position in the two-dimensional plane is converted to the transition of the eye position in the three-dimensional space. In this way, it is possible to estimate an actual position of the eyes (information in the three-dimensional space), from the movement information about the eyes detected from the image (information in the two-dimensional plane). Since it is possible to estimate the actual eye position as described above, the imaging system 10 according to the third example embodiment is capable of performing more appropriate imaging.

Fourth Example Embodiment

The imaging system 10 according to a fourth example embodiment will be described with reference to FIG. 7 and FIG. 8. The fourth example embodiment is partially different from the first to third example embodiments only in the operation, and may be the same as the first to third example embodiments in the other parts. For this reason, a part that is different from each of the example embodiments described above will be described in detail below, and a description of other overlapping parts will be omitted as appropriate.

(Flow of Operation)

First, with reference to FIG. 7, a flow of operation of the imaging system 10 according to the fourth example embodiment will be described. FIG. 7 is a flowchart illustrating the flow of the operation of the imaging system according to the second example embodiment. In FIG. 7, the same steps as those illustrated in FIG. 4 carry the same reference numerals.

Figure 7:
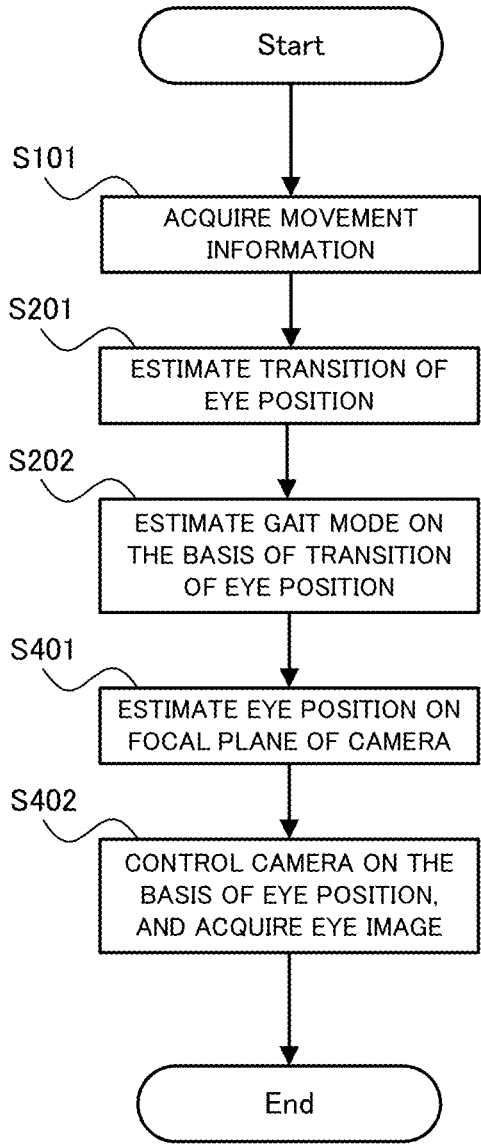
FIG. 7 is a flowchart illustrating a flow of operation of an imaging system according to a fourth example embodiment.

As illustrated in FIG. 7, when the operation of the imaging system 10 according to the fourth example embodiment is started, first, the information acquisition unit 110 acquires the movement information about the movement of at least at a part ("eyes" in this case) of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on a focal plane of the camera 18, on the basis of the periodicity estimated by the periodicity estimation unit 120 (i.e., the periodicity indicated by the gait model) (step S401). Then, the image acquisition unit 130 controls the camera 18 in accordance with the eye position on the focal plane of the camera 18, and acquires the eye image of the target (step S402). A method of controlling the cameras 18 in accordance with the eye position will be described in detail in another example embodiment later.

(Eye Position Estimation)

Next, with reference to FIG. 8, a specific example of an operation of estimating the eye position by the imaging system 10 according to the fourth example embodiment will be described. FIG. 8 is a graph indicating an example of a method of estimating the eye position on the focal plane from the gait model.

Figure 8:
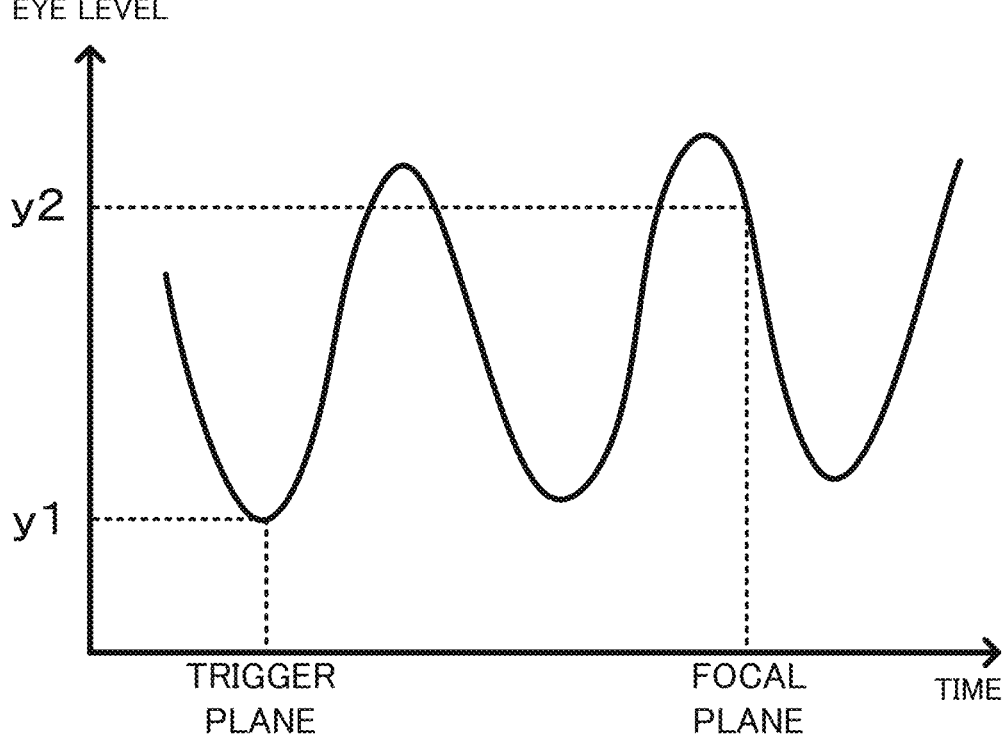
FIG. 8 is a graph illustrating an example of a method of estimating an eye position on a focal plane by using a gait model.

As illustrated in FIG. 8, let us assume that the gait model is acquired as a time-series periodic transition of the eye level of the target (e.g., see the above equation (1)). In this case, by acquiring the eye level (y1 in the figure) on a trigger plane serving as a reference (a reference point whose positional relation with the focal plane is known), it is possible to estimate the eye level (y2 in the figure) on the focal plane of the camera 18 from the gait model.

(Technical Effect)

Next, a technical effect obtained by the imaging system 10 according to the fourth example embodiment will be described.

As described in FIG. 7 and FIG. 8, in the imaging system 10 according to the fourth example embodiment, the eye position on the focal plane of the camera 18 is estimated on the basis of the gait model. In this way, even when the focal plane of the camera is small/narrow (in other words, a depth of field is small/narrow), it is possible to properly capture the eye image.

Fifth Example Embodiment

The imaging system 10 according to a fifth example embodiment will be described with reference to FIG. 9 to FIG. 12. The fifth example embodiment is partially different from the first to fourth example embodiments only in the configuration and operation, and may be the same as the first to fourth example embodiments in the other parts. For this reason, apart that is different from each of the example embodiments described above will be described in detail below, and a description of other overlapping parts will be omitted as appropriate.

(Camera Configuration)

Figure 9:
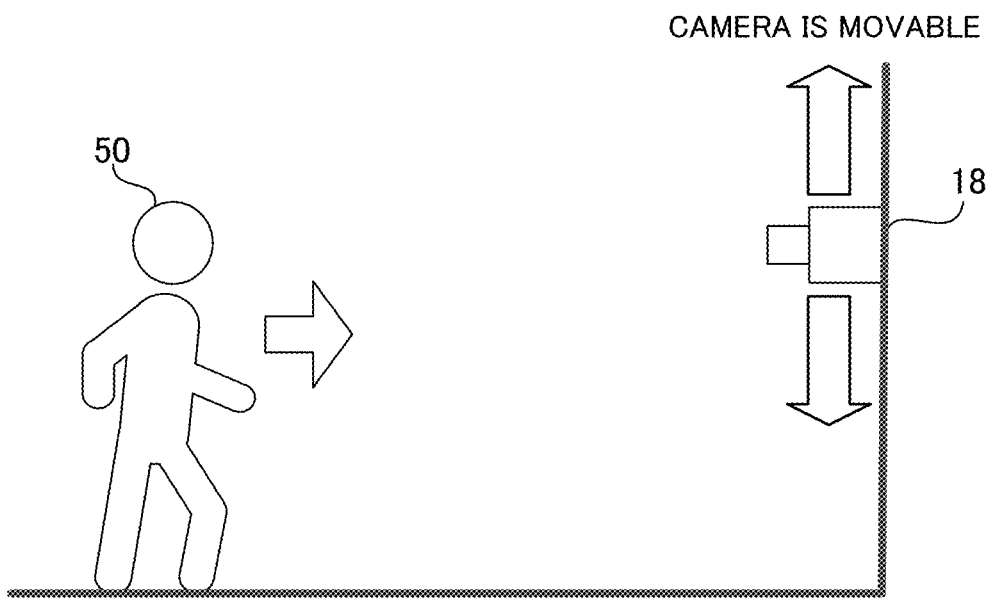
FIG. 9 is a side view illustrating a configuration of a camera in an imaging system according to a fifth example embodiment.

First, with reference to FIG. 9, a camera configuration of the imaging system 10 according to the fifth example embodiment will be described. FIG. 9 is a side view illustrating the configuration of the camera in the imaging system according to the fifth example embodiment.

As illustrated in FIG. 9, in the imaging system 10 according to the fifth example embodiment, the camera 18 is movable. That is, an imaging range of the camera 18 is configured to be changed by moving the camera itself. The camera 18 may be movable in a vertical direction as illustrated in the figure, or may be movable in a horizontal/lateral direction, or in a diagonal direction. The camera 18 may be movable in a direction of approaching the target (i.e., a left direction in FIG. 9), or in a direction of going away from the target (i.e., a right direction in FIG. 9). That is, a moving direction of the camera 18 is not particularly limited. The camera 18 may also be configured to change an imaging angle, as well as to move. For example, by controlling an angle of the camera 18 to be changed, the imaging range may be changed. The movement of the camera 18 may be configured to be controlled by the image acquisition unit 130.

(Flow of Operation)

Figure 10:
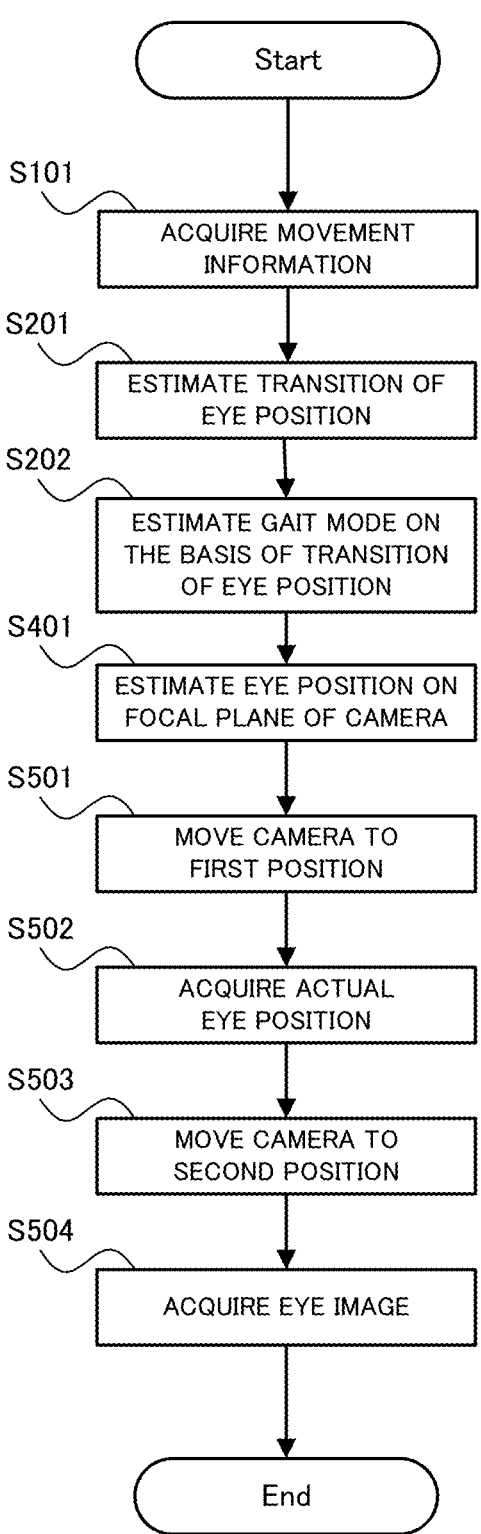
FIG. 10 is a flowchart illustrating a flow of operation of the imaging system according to the fifth example embodiment.

Next, with reference to FIG. 10, a flow of operation of the imaging system 10 according to the fifth example embodiment will be described. FIG. 10 is a flowchart illustrating the flow of the operation of the imaging system according to the fifth example embodiment. In FIG. 10, the same steps as those illustrated in FIG. 7 carry the same reference numerals.

As illustrated in FIG. 10, when the operation of the imaging system 10 according to the fifth example embodiment is started, first, the information acquisition unit 110 acquires the movement information about the movement of at least at a part of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on the focal plane of the camera 18, on the basis of the periodicity estimated by the periodicity estimation unit 120 (i.e., the periodicity indicated by the gait model) (step S401). Then, the image acquisition unit 130 moves the camera 18 to a first position corresponding to the estimated eye position on the focal plane of the camera 18 (step S501).

Subsequently, the image acquisition unit 130 acquires the actual eye position before the target is imaged (i.e., before the target arrives at the focal plane of the camera 18) (step S502). The actual eye position may be acquired, for example, from the image captured by the camera 18 (i.e., the image captured before the focal plane), or may be acquired through another route.

Subsequently, the image acquisition unit 130 moves the camera 18 to a second position corresponding to the actual eye position (step S503). Then, the image acquisition unit 130 acquires the eye image by imaging the target with the camera 18 (step S504). In a case where the first position and the second position are the same position (i.e., in a case where the estimated eye position is the same as the actual eye position), the step S503 may be omitted.

Modified Examples

Figure 11:
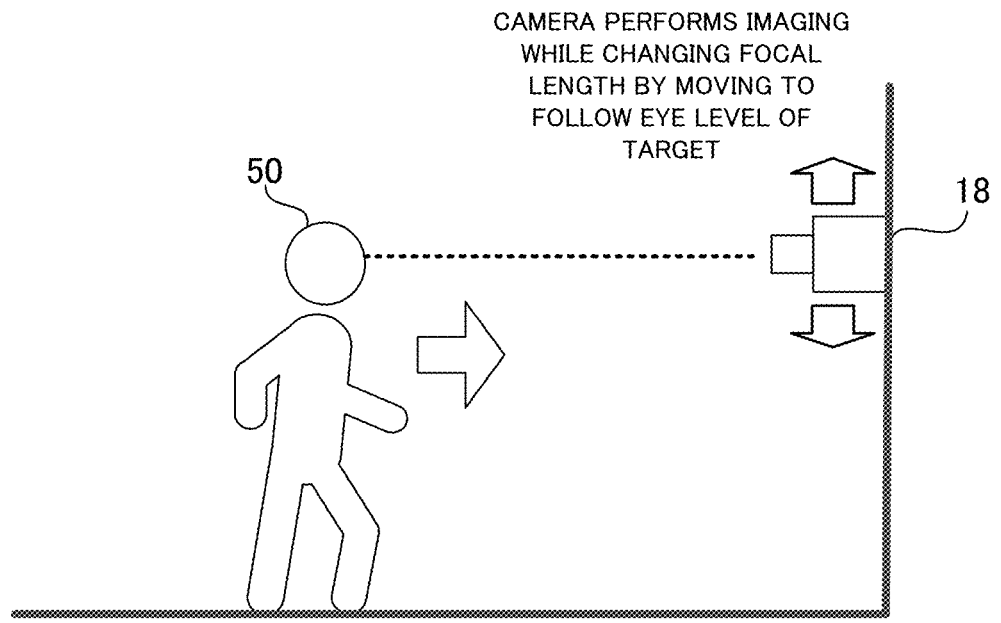
FIG. 11 is version 1 of a side view illustrating a modified example of the configuration of the camera in the imaging system according to the fifth example embodiment.
Figure 12:
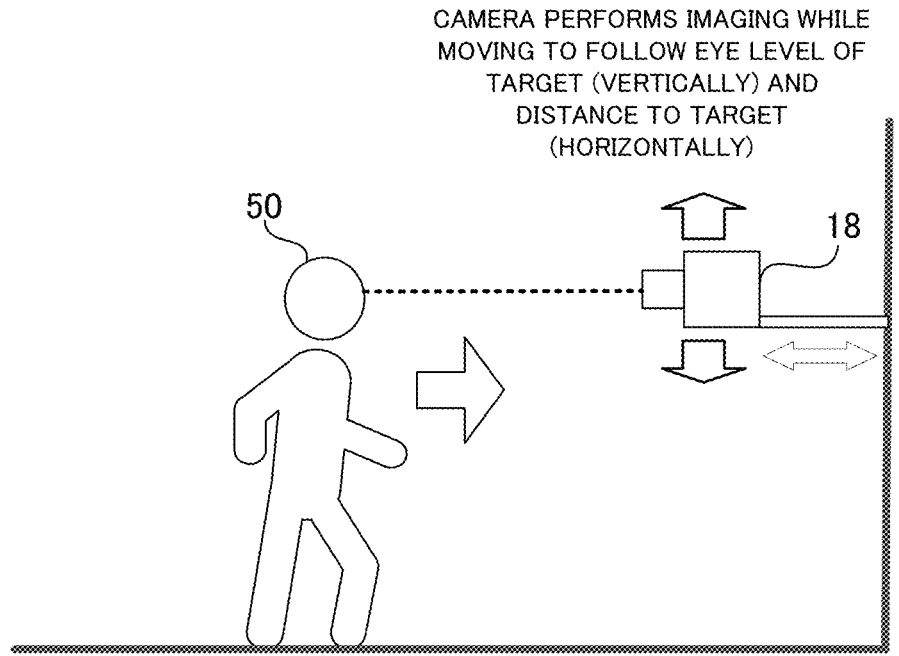
FIG. 12 is version 2 of a side view illustrating a modified example of the configuration of the camera in the imaging system according to the fifth example embodiment.

Next, with reference to FIG. 11 and FIG. 12, modified examples of the imaging system according to the fifth example embodiment (specifically, modified examples regarding the configuration and control of the camera 18) will be described. FIG. 11 is version 1 of a side view illustrating a modified example of the configuration of the camera in the imaging system according to the fifth example embodiment. FIG. 12 is version 2 of a side view illustrating a modified example of the configuration of the camera in the imaging system according to the fifth example embodiment. In FIG. 11 and FIG. 12, the same components as those illustrated in FIG. 9 carry the same reference numerals.

As illustrated in FIG. 11, in the modified example of the imaging system according to the fifth example embodiment, the camera 18 may continuously capture the images of the target. For example, the camera 18 may capture a video of a moving target. The camera 18 may capture the images while changing the eye level at any time, on the basis of the eye position estimated based on the periodicity. That is, the camera 18 may be moved vertically to follow the eye position of the target. In this instance, the image acquisition unit 130 may perform processing of repeatedly estimating the eye position on the basis of the periodicity. Furthermore, the camera 18 may perform the imaging while changing a focal length in accordance with the distance to the target. That is, the focal length may be changed such that the target who approaches the camera 18 continues to be in focus. The distance to the target (i.e., a relative positional relation between the camera 18 and the target) may be acquired by various sensors, or may be estimated from moving velocity of the target or the like. The camera 18 may change the focal length by controlling a liquid lens, for example.

As illustrated in FIG. 12, in another modified example of the imaging system according to the fifth example embodiment, the camera 18 may be movable along a moving direction of the target (i.e., in a horizontal direction of the figure). For example, the camera 18 may be moved such that the distance to the target is maintained to be one meter. In this case, even if the camera 18 is not capable of changing the focal length, the camera 18 itself may move to adjust the focus, thereby continuously imaging the eyes of the moving target.

(Technical Effect)

Next, a technical effect obtained by the imaging system 10 according to the fifth example embodiment will be described.

As described in FIG. 9 to FIG. 12, in the imaging system 10 according to the fifth example embodiment, the imaging is performed after the position of the camera 18 controlled in accordance with the estimated eye position is adjusted in accordance with the actual eye position. In this way, it is possible to properly acquire the eye image even when there is a deviation in the estimated eye position. Furthermore, since the camera 18 is moved on the basis of the eye position estimated in advance, it is possible to move the camera 18 to an appropriate position in a shorter time than a time required in a case of starting the camera 18 to move after the actual eye position is acquired.

Sixth Example Embodiment

The imaging system 10 according to a sixth example embodiment will be described with reference to FIG. 13 to FIG. 16. The sixth example embodiment is partially different from the first to fifth example embodiments only in the configuration and operation, and may be the same as the first to fifth example embodiments in the other parts. For this reason, a part that is different from each of the example embodiments described above will be described in detail below, and a description of other overlapping parts will be omitted as appropriate.

(Camera Configuration)

Figure 13:
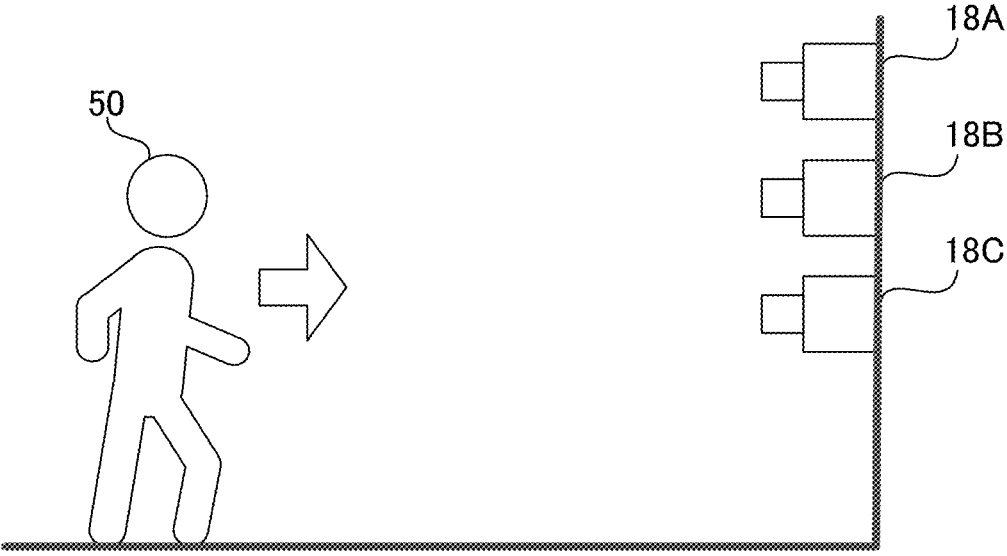
FIG. 13 is a side view illustrating a configuration of a camera in an imaging system according to a sixth example embodiment.

First, with reference to FIG. 13, a camera configuration of the imaging system 10 according to the sixth example embodiment will be described. FIG. 13 is a side view illustrating the configuration of the camera in the imaging system according to the sixth example embodiment.

As illustrated in FIG. 13, in the imaging system 10 according to the sixth example embodiment, a plurality of cameras 18 are installed (in the example illustrated in the figure, a camera 18A, a camera 18B, and a camera 18C at different levels). The imaging range may be changed by selecting one actually used for the imaging out of the plurality of cameras 18. For example, when the camera 18A mounted at the highest position is selected, the imaging range is a high range. When the camera 18B mounted in the middle is selected, the imaging range is a range near the middle. When the camera 18C mounted at the lowest position is selected, the imaging range is a low range. In the example illustrated in the figure, the plurality of cameras 18 are mounted in line in a longitudinal/vertical direction, but may be mounted in line in the horizontal direction, or in the diagonal direction. The selection of the camera 18 used for the imaging may be performed by the image acquisition unit 130.

(Flow of Operation)

Figure 14:
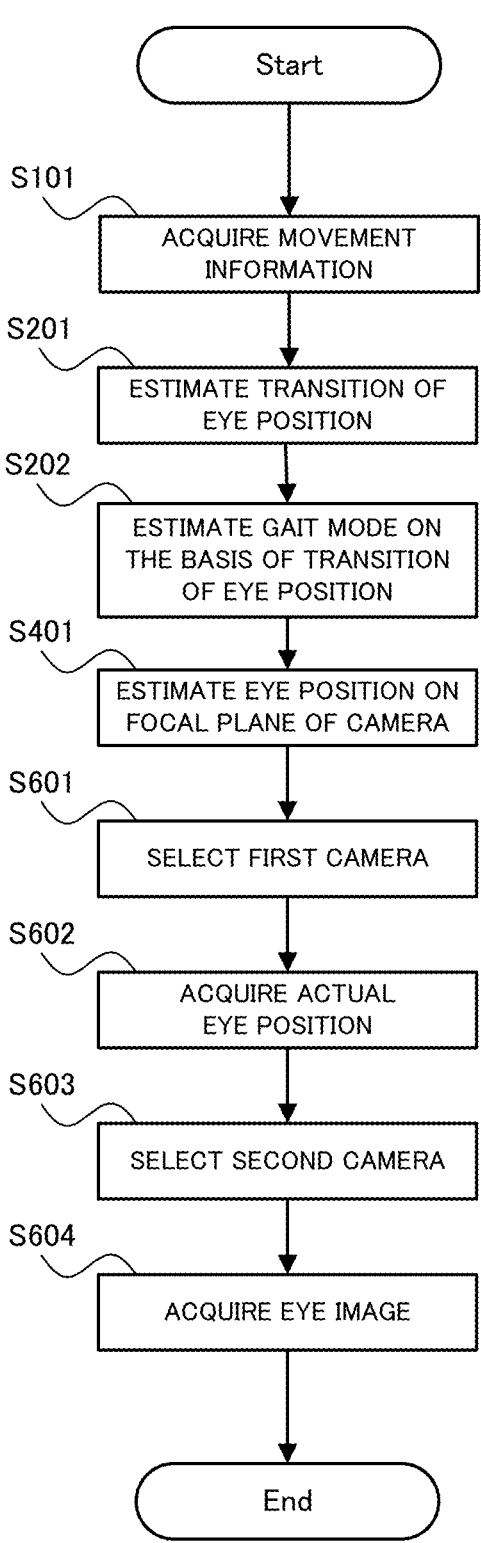
FIG. 14 is a flowchart illustrating a flow of operation of the imaging system according to the sixth example embodiment.

Next, with reference to FIG. 14, a flow of operation of the imaging system 10 according to the sixth example embodiment will be described. FIG. 14 is a flowchart illustrating the flow of the operation of the imaging system according to the sixth example embodiment. In FIG. 14, the same steps as those illustrated in FIG. 7 carry the same reference numerals.

As illustrated in FIG. 14, when the operation of the imaging system 10 according to the sixth example embodiment is started, first, the information acquisition unit 110 acquires the movement information about the movement of at least at a part of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on the focal plane of the camera 18, on the basis of the periodicity estimated by the periodicity estimation unit 120 (i.e., the periodicity indicated by the gait model) (step S401). Then, the image acquisition unit 130 selects a first camera corresponding to the estimated eye position on the focal plane of the camera 18 (step S601).

Subsequently, the image acquisition unit 130 acquires the actual eye position before the target is imaged (i.e., before the target arrives at the focal plane of the camera 18) (step S602). The actual eye position may be acquired, for example, from the image captured by the camera 18 (i.e., the image captured before the focal plane), or may be acquired through another route.

Subsequently, the image acquisition unit 130 selects a second camera corresponding to the actual eye position (step S603). Then, the image acquisition unit 130 images the target by the selected cameras 18 and acquires the eye image (step S604). In a case where the first camera is the same as the second camera (i.e., in a case where the estimated eye position is the same as the actual eye position), the step S603 may be omitted. In a case where the deviation is in a predetermined range (i.e., in a case where the deviation is small enough not to change the camera to be selected), the selected camera 18 may not be changed, but offset (a range to be cut as the image to be acquired) may be used to handle the situation.

Modified Examples

Figure 15:
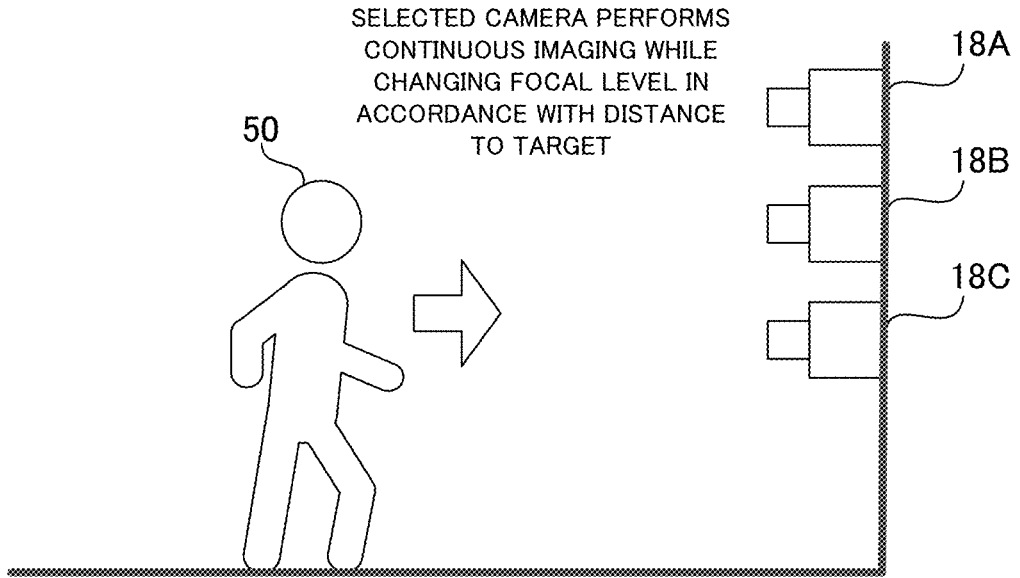
FIG. 15 is version 1 of a side view illustrating a modified example of the configuration of the camera in the imaging system according to the sixth example embodiment.
Figure 16:
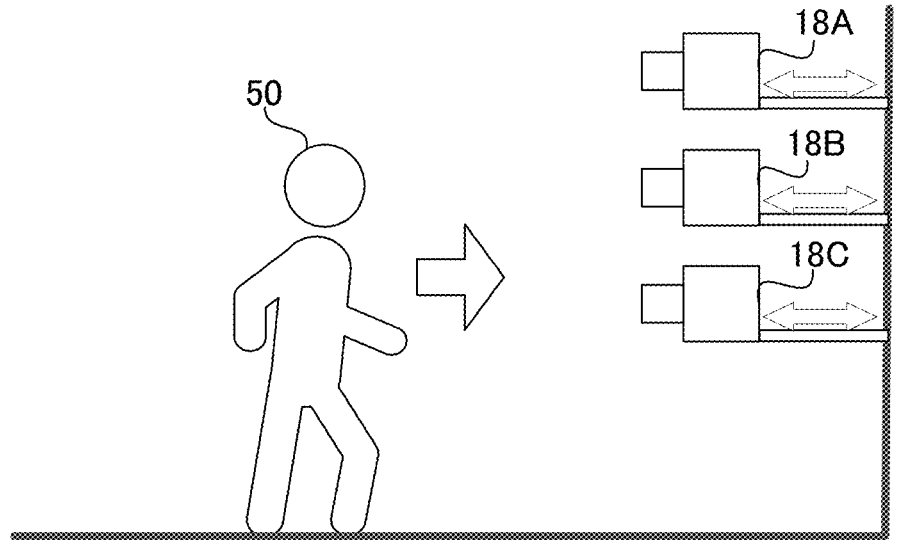
FIG. 16 is version 2 of a side view illustrating a modified example of the configuration of the camera in the imaging system according to the sixth example embodiment.

Next, with reference to FIG. 15 and FIG. 16, a modified example of the imaging system according to the sixth example embodiment (specifically, modified examples regarding the configuration and control of the camera 18) will be described. FIG. 15 is version 1 of a side view illustrating a modified example of the configuration of the camera in the imaging system according to the sixth example embodiment. FIG. 16 is version 2 of a side view illustrating a modified example of the configuration of the camera in the imaging system according to the sixth example embodiment. In FIG. 15 and FIG. 16, the same components as those illustrated in FIG. 13 carry the same reference numerals.

As illustrated in FIG. 15, in a modified example of the imaging system according to the sixth example embodiment, the camera 18 may continuously capture the images of the target. For example, the camera 18 may capture a video of a moving target. After being selected on the basis of the eye position estimated based on the periodicity, the camera 18 may capture the images while changing the focal length in accordance with the distance to the target. That is, the focal length may be changed such that the target who approaches the camera 18 continues to be in focus. The distance to the target (i.e., the relative positional relation between the camera 18 and the target) may be acquired by various sensors, or may be estimated from the moving velocity of the target or the like. The camera 18 may change the focal length by controlling a liquid lens, for example.

As illustrated in FIG. 16, in another modified example of the imaging system according to the sixth example embodiment, the camera 18 may be movable along the moving direction of the target (i.e., in the horizontal direction of the figure). For example, the camera 18 may be moved such that the distance to the target is maintained to be one meter. In this case, even if the camera 18 is not capable of changing the focal length, the camera 18 itself may move to adjust the focus, thereby continuously imaging the eyes of the moving target. Although it is preferable that all of the plurality of cameras 18A to 18C are movable in the horizontal direction of the figure, at least one camera 18 may be movable in the horizontal direction.

In the modified examples described in FIG. 15 and FIG. 16, it is hard in some cases to continuously image the eye position of the target only by the selected cameras 18. For example, in the case of the camera 18A at the top, it is likely to be hard to continuously image the eyes when the eye position of the target is low. Similarly, in the case of the camera 18C at the bottom, it is likely to be hard to continuously image the eyes when the eye position of the target is high. In contrast, in the above modified examples, all the cameras A to C may perform continuous imaging (i.e., video filming) while simultaneously changing the focal length (or the distance to target) for all the cameras A to C, and then, editing may be performed to collect only videos in which an iris is captured (or to delete videos of the cameras 18 in which the iris is not captured) of the videos that could be filmed by the respective cameras 18. Alternatively, based on the periodicity of the eye position, videos to be used may be picked up from the videos recorded by all the cameras A to C (e.g., a video of the camera 18C at the bottom is used at 2 to 2.3 seconds, and a video of the camera 18B in the middle is used at 2.3 to 2.5 seconds).
(Technical Effect)

Next, a technical effect obtained by the imaging system 10 according to the sixth example embodiment will be described.

As described in FIG. 13 to FIG. 16, in the imaging system 10 according to the sixth example embodiment, after the camera 18 is selected in accordance with the estimated eye position, the camera 18 is selected again in accordance with the actual eye position. In this way, it is possible to properly acquire the eye image even when there is a deviation in the estimated eye position. In addition, since the camera 18 is selected on the basis of the eye position estimated in advance, in a case where the deviation in the estimated eye position is small, only the offset may be changed to handle the situation.

Seventh Example Embodiment

The imaging system 10 according to a seventh example embodiment will be described with reference to FIG. 17 to FIG. 20. The seventh example embodiment is partially different from the first to sixth example embodiments only in the configuration and operation, and may be the same as the first to sixth example embodiments in the other parts. For this reason, a part that is different from each of the example embodiments described above will be described in detail below, and a description of other overlapping parts will be omitted as appropriate.
(Camera Configuration)

Figure 17:
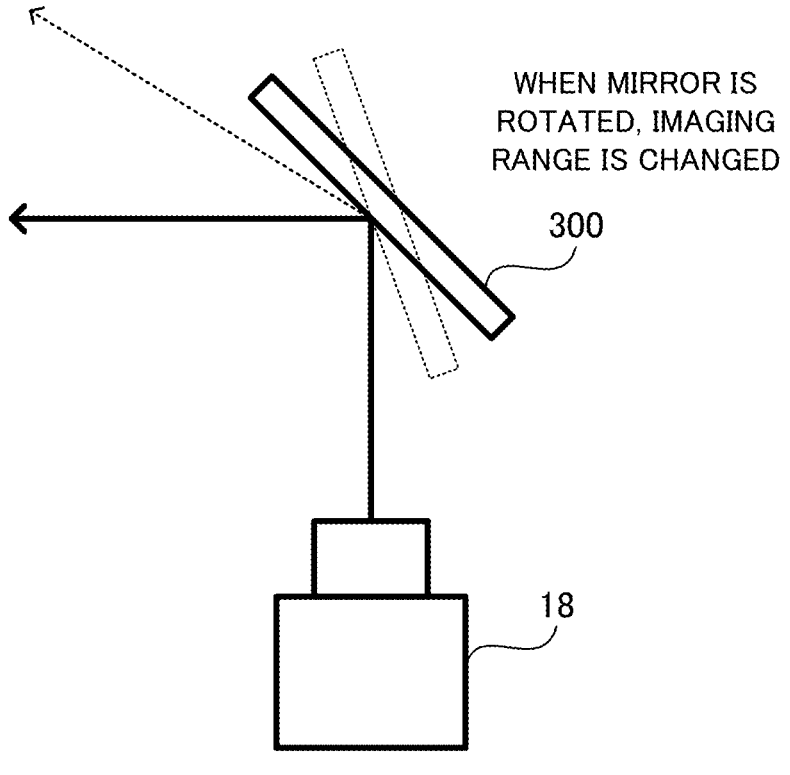
FIG. 17 is a side view illustrating a configuration of a camera in an imaging system according to a seventh example embodiment.

First, with reference to FIG. 17, a camera configuration of the imaging system 10 according to the seventh example embodiment will be described. FIG. 17 is a side view illustrating the configuration of the camera in the imaging system according to the seventh example embodiment.

As illustrated in FIG. 17, in the imaging system 10 according to the seventh example embodiment, the camera 18 is configured to image the target through a mirror 300. For example, the camera 18 is disposed to face the mirror 300 from below as illustrated, and is configured to image the target by utilizing reflection by the mirror 300. The mirror 300 is rotatably configured. Therefore, when the mirror 300 is rotated to change an angle thereof, the imaging range of the camera is also changed. An arrangement relationship between the camera 18 and the mirror 300 is not limited to the example illustrated in the figure. The rotation of the mirror 300 is configured to be controlled by the image acquisition unit 130.
(Flow of Operation)

Figure 18:
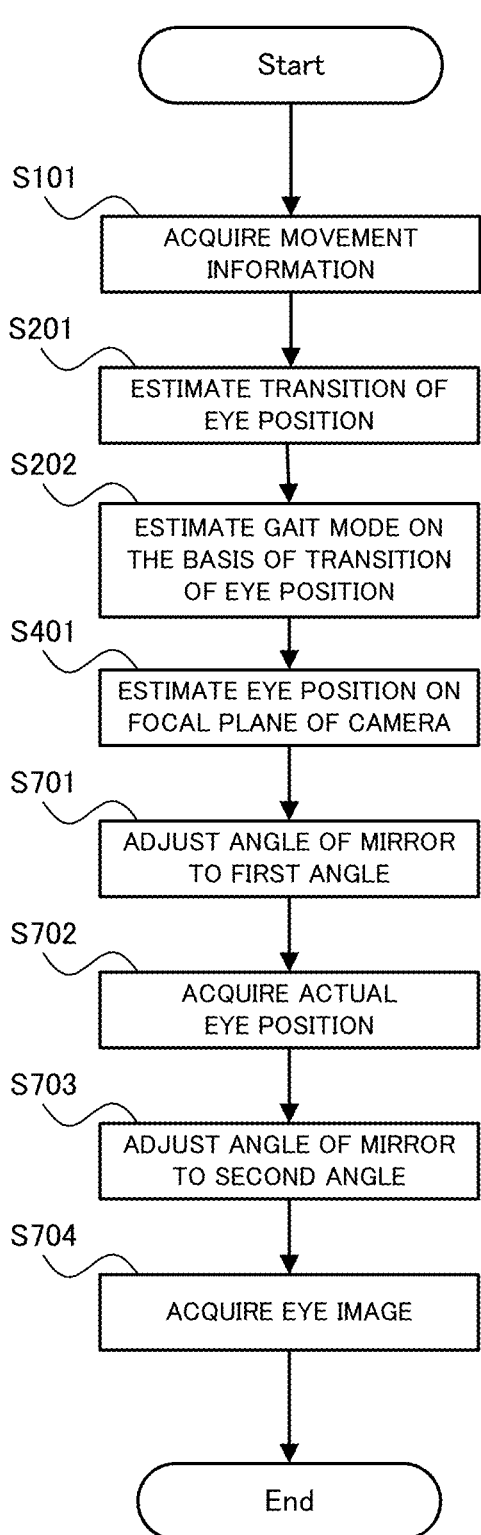
FIG. 18 is a flowchart illustrating a flow of operation of the imaging system according to the seventh example embodiment.

Next, with reference to FIG. 18, a flow of operation of the imaging system 10 according to the seventh example embodiment will be described. FIG. 18 is a flowchart illustrating the flow of the operation of the imaging system according to the seventh example embodiment. In FIG. 18, the same steps as those illustrated in FIG. 7 carry the same reference numerals.

As illustrated in FIG. 18, when the operation of the imaging system 10 according to the seventh example embodiment is started, first, the information acquisition unit 110 acquires the movement information about the movement of at least at a part of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on the focal plane of the camera 18, on the basis of the periodicity estimated by the periodicity estimation unit 120 (i.e., the periodicity indicated by the gait model) (step S401). Then, the image acquisition unit 130 controls the angle of the mirror 300 to be a first angle corresponding to the estimated eye position on the focal plane of the camera 18 (step S701).

Subsequently, the image acquisition unit 130 acquires the actual eye position before the target is imaged (i.e., before the target arrives at the focal plane of the camera 18) (step S702). The actual eye position may be acquired, for example, from the image captured by the camera 18 (i.e., the image captured before the focal plane), or may be acquired through another route.

Subsequently, the image acquisition unit 130 controls the angle of the mirror 300 to be a second angle corresponding to the actual eye position (step S703). Then, the image acquisition unit 130 acquires the eye image by imaging the target with the camera 18 (step S704). In a case where the first angle and the second angle are the same angle (i.e., in a case where the estimated eye position is the same as the actual eye position), the step S703 may be omitted.

Modified Examples

Figure 19:
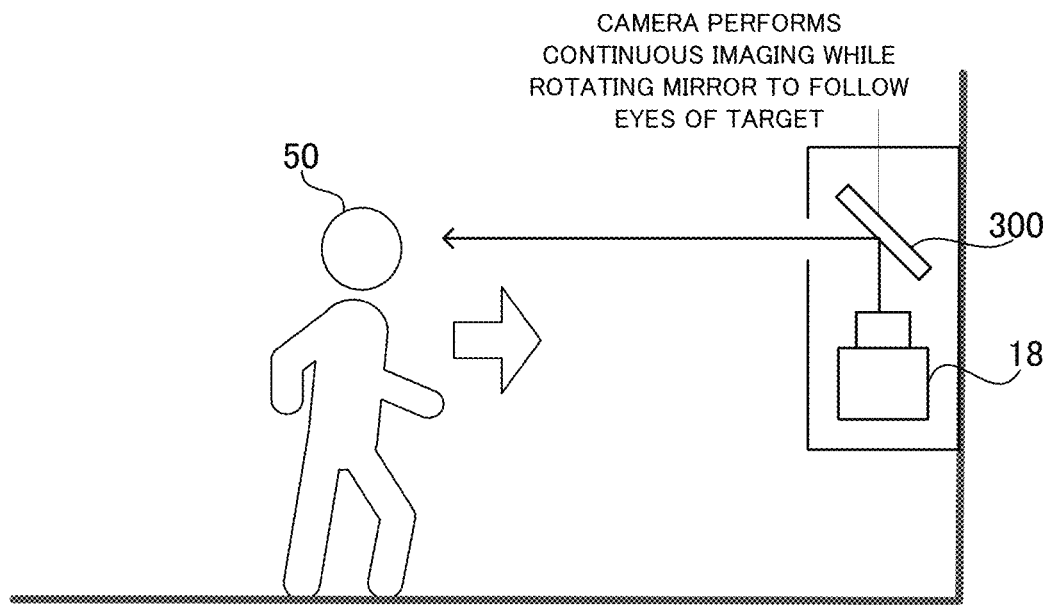
FIG. 19 is version 1 of a side view illustrating a modified example of the configuration of the camera in the imaging system according to the seventh example embodiment.
Figure 20:
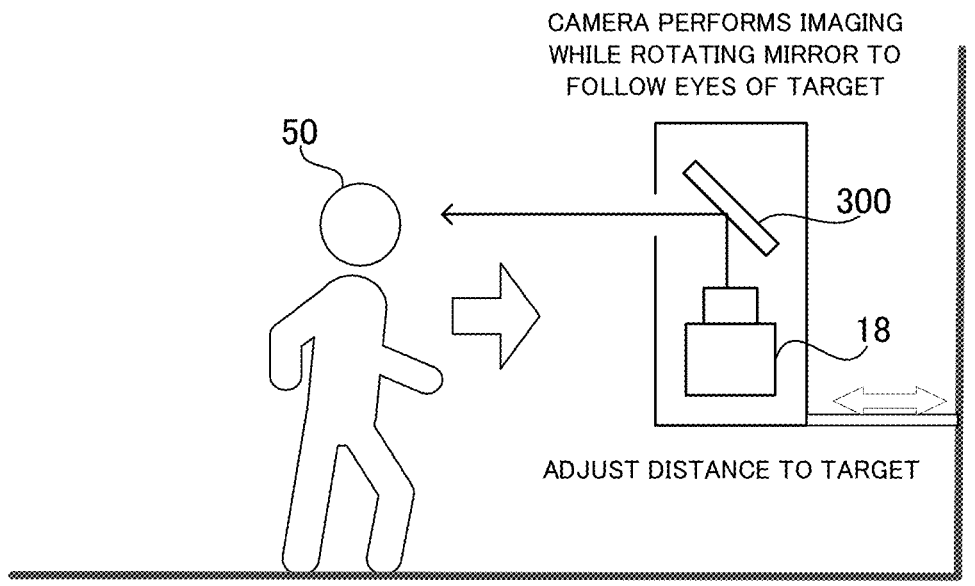
FIG. 20 is version 2 of aside view illustrating a modified example of the configuration of the camera in the imaging system according to the seventh example embodiment.

Next, with reference to FIG. 19 and FIG. 20, modified examples of the imaging system according to the seventh example embodiment (specifically, modified examples regarding the configuration and control of the camera 18) will be described. FIG. 19 is version 1 of a side view illustrating a modified example of the configuration of the camera in the imaging system according to the seventh example embodiment. FIG. 20 is version 2 of a side view illustrating a modified example of the configuration of the camera in the imaging system according to the seventh example embodiment. In FIG. 19 and FIG. 20, the same components as those illustrated in FIG. 17 carry the same reference numerals.

As illustrated in FIG. 19, in a modified example of the imaging system according to the seventh example embodiment, the camera 18 may continuously capture the im the target. For example, the camera 18 may capture a video of a moving target. The camera 18 may capture the images while rotating the mirror 300 at any time, on the basis of the eye position estimated based on the periodicity. That is, the imaging range of the camera 18 may be controlled to follow the eye position of the target. In this instance, the image acquisition unit 130 may perform the processing of repeatedly estimating the eye position on the basis of the periodicity. Furthermore, the camera 18 may perform the imaging while changing the focal length in accordance with the distance to the target. That is, the focal length may be changed such that the target who approaches the camera 18 continues to be in focus. The distance to the target (i.e., the relative positional relation between the camera 18 and the target) may be acquired by various sensors, or may be estimated from moving velocity of the target or the like. The camera 18 may change the focal length by controlling a liquid lens, for example.

As illustrated in FIG. 20, in another modified example of the imaging system according to the seventh example embodiment, the camera 18 may be movable along the moving direction of the target (i.e., in the horizontal direction of the figure). For example, the camera 18 may be moved such that the distance to the target is maintained to be one meter. In this case, the camera 18 and the mirror 300 may be integrally movable. In this configuration, even if the camera 18 is not capable of changing the focal length, the camera 18 itself may move to adjust the focus, thereby continuously imaging the eyes of the moving target.
(Technical Effect)

Next, a technical effect obtained by the imaging system 10 according to the seventh example embodiment will be described.

As described in FIG. 17 to FIG. 20, in the imaging system 10 according to the seventh example embodiment, the angle of the mirror 300 controlled in accordance with the estimated eye position is adjusted in accordance with the actual eye position, and then, the imaging is performed. In this way, it is possible to properly acquire the eye image even when there is a deviation in the estimated eye position. In addition, since the mirror 300 is controlled on the basis of the eye position estimated in advance, it is possible to control the mirror 300 at an appropriate angle in a shorter time than a time required in a case of starting the camera 18 to move after the actual eye position is acquired.

Eighth Example Embodiment

The imaging system 10 according to an eighth example embodiment will be described with reference to FIG. 21. The eighth example embodiment is partially different from the first to seventh example embodiments only in the operation, and may be the same as the first to seventh example embodiments in the other parts. For this reason, a part that is different from each of the example embodiments described above will be described in detail below, and a description of other overlapping parts will be omitted as appropriate.
(Imaging Control)

First, with reference to FIG. 21, imaging control (i.e., control when the image of the target is captured) by the imaging system 10 according to the eighth example embodiment will be described. FIG. 21 is a graph illustrating a difference in an amount of change in the eye position per unit time.

Figure 21:
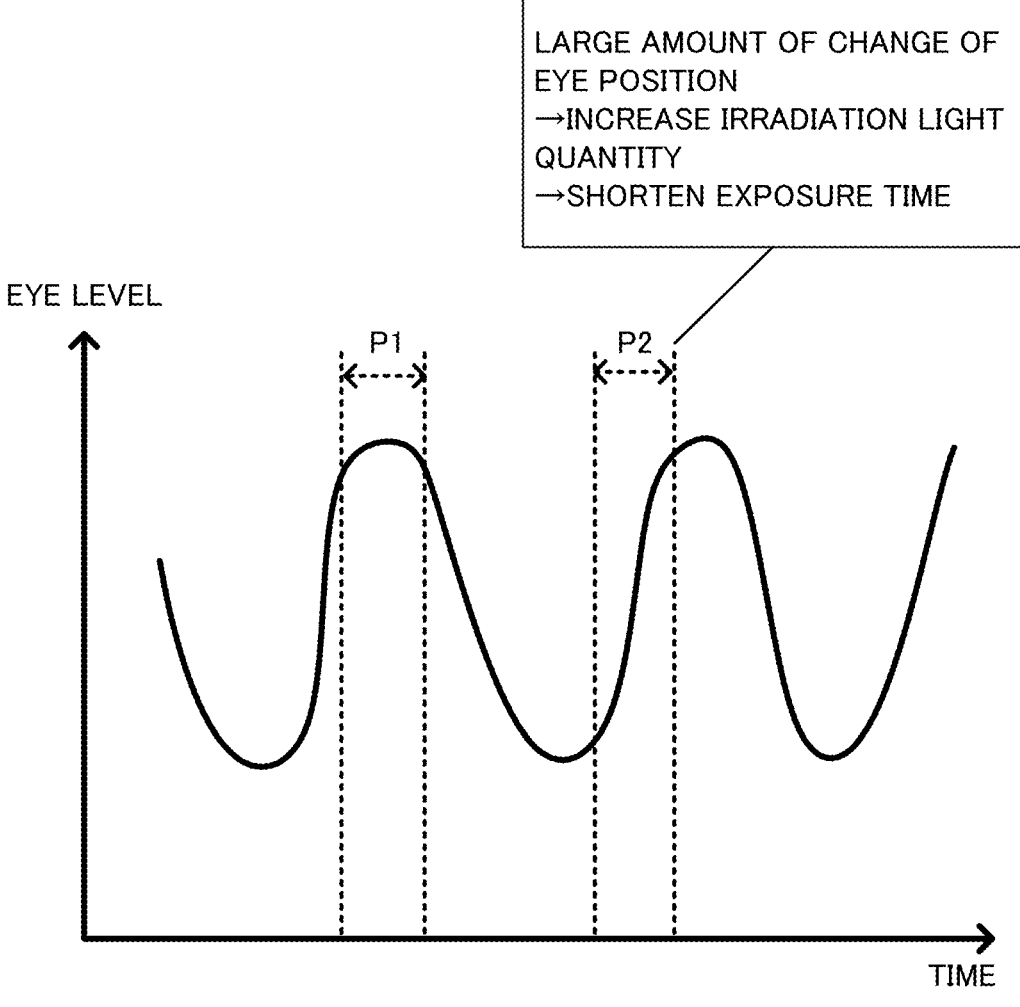
FIG. 21 is a graph illustrating a difference in an amount of change in the eye position per unit time

As illustrated in FIG. 21, in the eye level of the target, there are parts where an amount of change decreases and increases depending on timing. For example, in a period P1 in FIG. 21, the amount of change in the eye position per unit time is relatively small. On the other hand, in a period P2, the amount of change in the eye position per unit time is relatively large.

The image acquisition unit 130 according to the eighth example embodiment is configured to change an imaging condition in accordance with the amount of change in the eye level per unit time. Specifically, the image acquisition unit 130 performs at least one of a control of increasing irradiation light quantity applied to a target 50 and a control of shortening an exposure time of the camera 18 (i.e., a control of increasing a shutter speed) in a case where the amount of change in the eye level per unit time is greater than a predetermined value in the timing of imaging (i.e., on the focal plane of the camera 18). In this case, the irradiation light quantity and the exposure time may be controlled simultaneously. The "predetermined value" herein may be set to an appropriate value in advance, in accordance with the possibility of blurring of the target or the like. Although exemplified here is the control performed in a case where the amount of change in the eye level per unit time is greater than a predetermined value (i.e., a period corresponding to P2 in FIG. 21), the control may also be performed in a case where the amount of change in the eye level is less than the predetermined value (i.e., a period corresponding to P1 in FIG. 21). Specifically, in a case where the amount of change in the eye level per unit time is less than the predetermined value, at least one of a control of reducing the irradiation light quantity applied to the target 50 and a control of extending the exposure time of the camera 18 (i.e., a control of slowing down the shutter speed) may be performed. Even in this case, the irradiation light quantity and the exposure time may be controlled simultaneously. Furthermore, in order to perform each of the two controls, a plurality of predetermined values may be set. For example, a "first predetermined value" for determining that the amount of change in the eye level per unit time is increased, and a "second predetermined value" for determining that the amount of change in the eye level per unit time is reduced, may be set separately.

The control of increasing the irradiation light quantity may be, for example, a control of increasing the quantity of light in lighting built in the camera 18, lighting associated with the camera 18, a lighting apparatus in a room used for the imaging. The lighting associated with the camera 18 may be lighting attached to a housing of the camera 18, or may be lighting disposed at a position away from the camera 18. In this case, the camera 18 and the lighting may be configured to communicate with each other wirelessly. Alternatively, a curtain of the room or the like may be controlled to control the quantity of light entering the room from outside.
(Technical Effect)

Next, a technical effect obtained by the imaging system 10 according to the eighth example embodiment will be described.

As described in FIG. 21, in the imaging system 10 according to the eighth example embodiment, in a case where the amount of change in the eye level per unit time is greater than a predetermined value, at least one of the control of increasing the irradiation light quantity applied to the target 50 and the control of shortening the exposure time of the camera 18 is performed. In this way, it is possible to acquire a clear/sharp image (i.e., a less blurred image) even when the imaging is performed in timing when the eye position changes relatively significantly.

Ninth Example Embodiment

The imaging system 10 according to a ninth example embodiment will be described with reference to FIG. 22. The ninth example embodiment is partially different from the first to eighth example embodiments only in the operation, and may be the same as the first to eighth example embodiments in the other parts. For this reason, a part that is different from each of the example embodiments described above will be described in detail below, and a description of other overlapping parts will be omitted as appropriate.

(Flow of Operation)

First, with reference to FIG. 22, a flow of operation of the imaging system 10 according to the ninth example embodiment will be described. FIG. 22 is a flowchart illustrating the flow of the operation of the imaging system according to the ninth example embodiment. In FIG. 22, the same steps as those illustrated in FIG. 3 carry the same reference numerals.

Figure 22:
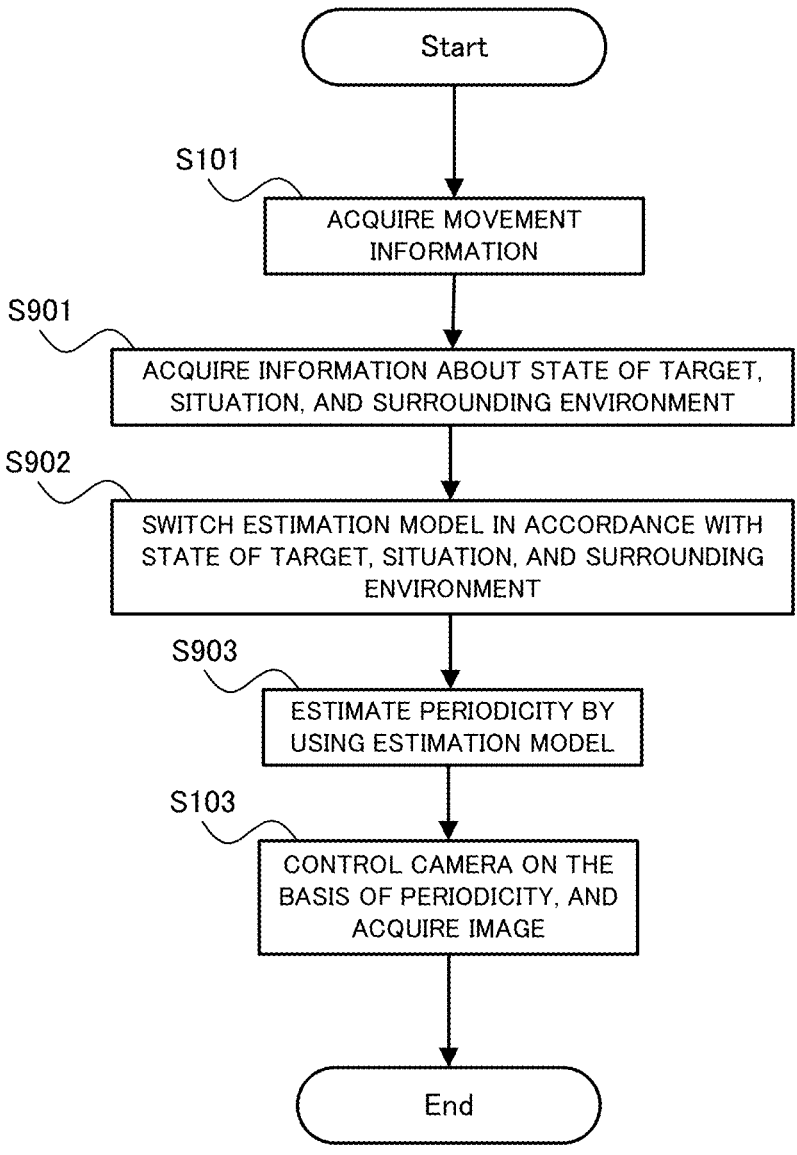
FIG. 22 is a flowchart illustrating a flow of operation of an imaging system according to a ninth example embodiment.

As illustrated in FIG. 22, when the operation of the imaging system 10 according to the ninth example embodiment is started, first, the information acquisition unit 110 acquires the movement information about the movement of at least at a part of the target (step S101). The information acquisition unit 110 according to the ninth example embodiment also acquires pieces of information about a state, a situation, and a surrounding environment of the target, in addition to the movement information (step S901). The information acquisition unit 110 may acquire at least one of the pieces of information about the state, the situation, and the surrounding environment of the target.

The "state of the target" herein indicates a moving aspect of the target, and is acquired as information indicating whether the target is walking normally, is moving in a wheelchair, or is walking with the help of a stick, or the like, for example. The "situation of the target" indicates a current moving situation of the target, and is acquired as information indicating that the target suddenly moves slowly, that the target stops, or that the target changes the moving direction, for example. The "surrounding environment" indicates an environmental condition that may affect the movement of the target, and is acquired as information indicating that another person who is walking in front of the target stops suddenly, or that where the target is walking is crowded, for example. The information about the state, the situation, and the surrounding environment of the target may be acquired from the image captured by the camera 18 or the like, or may be acquired by another method.

The periodicity estimation unit 120 according to the ninth example embodiment includes a plurality of estimation models for estimating the periodicity. The plurality of estimation models for estimating the periodicity may be learned on the assumption of a case of different states, situations, and surrounding environments of the target. The periodicity estimation unit 120 switches the estimation models on the basis of at least one of the pieces of information about the state, the situation, and the surrounding environment of the target, as described above (step S902). That is, the periodicity estimation unit 120 selects an estimation model corresponding to a current state, situation, and surrounding environment of the target.

Subsequently, the periodicity estimation unit 120 estimates the periodicity by using the selected estimation model (step S903). Then, the image acquisition unit 130 controls the camera 18 on the basis of the periodicity estimated by the periodicity estimation unit 120, and acquires the image of the target (step S103).

(Technical Effect)

Next, a technical effect obtained by the imaging system 10 according to the ninth example embodiment will be described.

As described in FIG. 22, in the imaging system 10 according to the ninth example embodiment, the estimation models are switched in accordance with the state, the situation, and the surrounding environment of the target. In this way, it is possible to properly estimate the periodicity in accordance with the state, the situation, and the surrounding environment of the target, and it is possible to acquire a more appropriate image, as compared with in a case where the estimation models are not switched.

Tenth Example Embodiment

The imaging system 10 according to a tenth example embodiment will be described with reference to FIG. 23. The tenth example embodiment is partially different from the first to ninth example embodiments only in the configuration and operation, and may be the same as the first to ninth example embodiments in the other parts. For this reason, a part that is different from each of the example embodiments described above will be described in detail below, and a description of other overlapping parts will be omitted as appropriate.

(Learning in Consideration of Deceleration)

First, learning of the estimation model in the imaging system 10 according to the tenth example embodiment will be described with reference to FIG. 23. FIG. 23 is a side view illustrating an example of a point where the target decelerates.

In the imaging system 10 according to the tenth example embodiment, the periodicity estimation unit 120 estimates the periodicity by using the estimation model learned in advance. In particular, the estimation model used by the periodicity estimation unit 120 is learned in consideration of deceleration of the target. More specifically, the estimation model is learned in consideration of the presence of a location where the moving target 50 is likely to decelerate, or the like. The "deceleration" herein refers to deceleration that may affect the periodicity estimated by the periodicity estimation unit 120.

Figure 23:
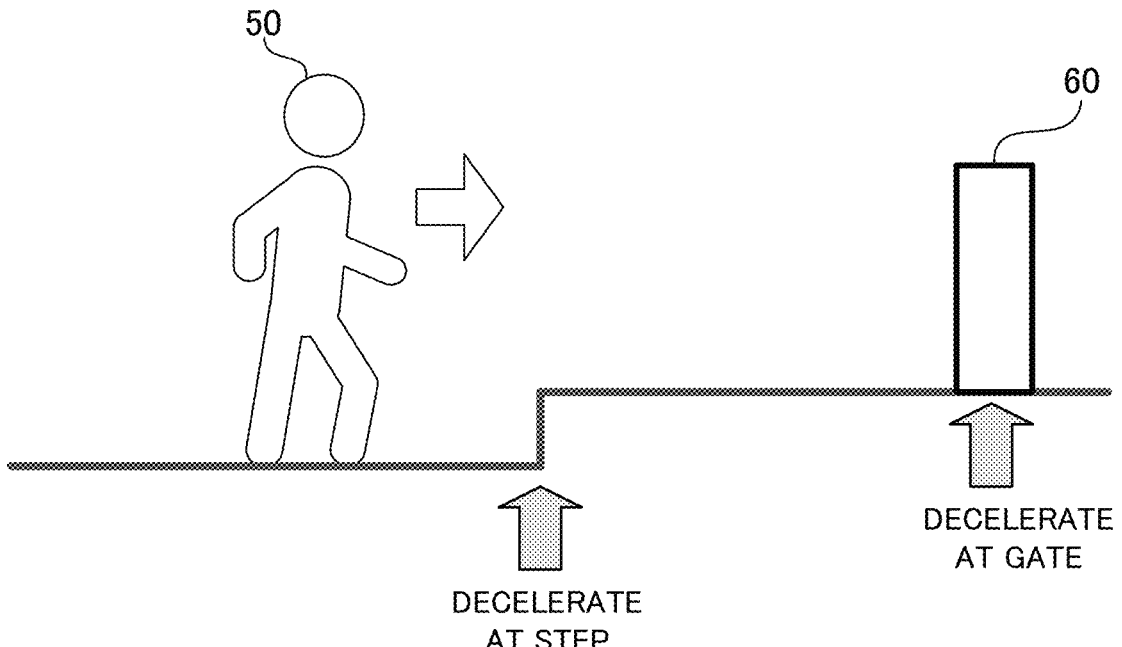
FIG. 23 is a side view illustrating an example of a point where a target decelerates.

As illustrated in FIG. 23, let us assume that there is a step or a gate 60 on a moving path of the target 50. The type of the gate 60 is not particularly limited. An example thereof includes a gate that controls passage of the target, such as a flapper gate. In this case, the target 50 is expected to decelerate at a point where there is the step. The target 50 is also expected to slow down in front of the gate 60. In this way, by acquiring in advance information about the location where the target 50 may decelerate, it is possible to learn the estimation model in consideration of the deceleration there. The periodicity estimation unit 120 may estimate the periodicity of the target and the eye position (eye level) at a focal position of the camera 18, by using the estimation model learned in consideration of the deceleration as described above.

(Technical Effect)

Next, a technical effect obtained by the imaging system 10 according to the tenth example embodiment will be described.

As described in FIG. 23, in the imaging system 10 according to the tenth example embodiment, the estimation model is learned in consideration of the deceleration of the target 50. In this way, it is possible to estimate the periodicity in consideration of an effect/influence of the deceleration of the target 50 on the periodicity. Therefore, it is possible to estimate the periodicity about the movement of the target with higher accuracy than that in a case without consideration of the deceleration.

Eleventh Example Embodiment

The imaging system 10 according to an eleventh example embodiment will be described with reference to FIG. 24.

The eleventh example embodiment is partially different from the first to tenth example embodiments only in the configuration and operation, and may be the same as the first to tenth example embodiments in the other parts. For this reason, a part that is different from each of the example embodiments described above will be described in detail below, and a description of other overlapping parts will be omitted as appropriate.

(Learning in Consideration of Change in Eye Position)

Figure 25:
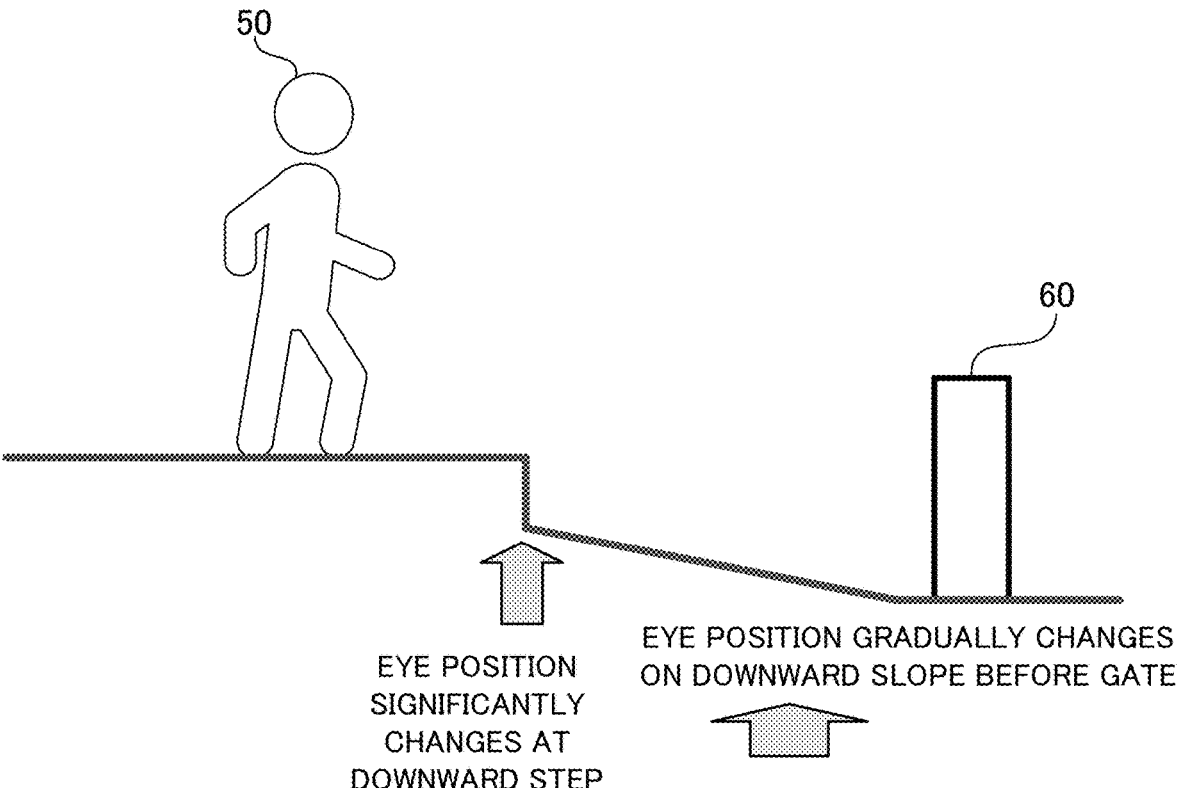
FIG. 25 is version 2 of a side view illustrating an example of the point where the eye position of the target changes.
Figure 26:
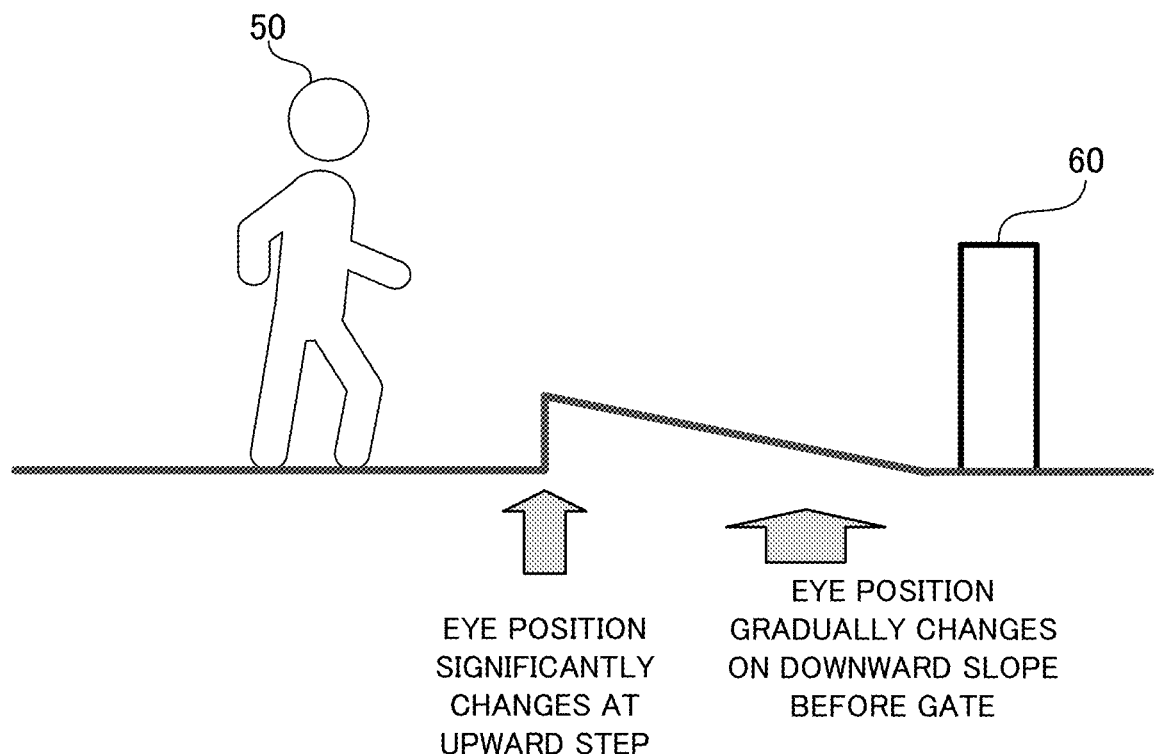
FIG. 26 is version 3 of a side view illustrating an example of the point where the eye position of the target changes.
Figure 27:
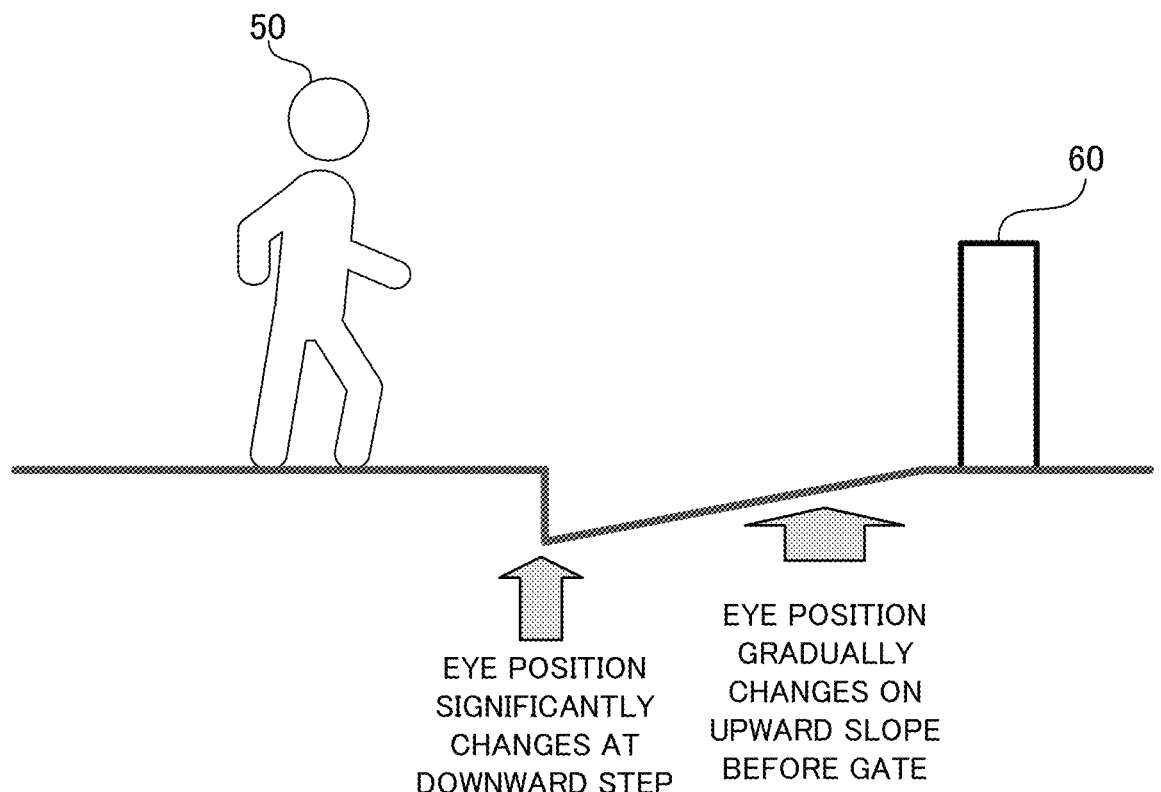
FIG. 27 is version 4 of a side view illustrating an example of the point where the eye position of the target changes.

First, with reference to FIG. 24 to 27, the learning of the estimation model in the imaging system 10 according to the eleventh example embodiment will be described. FIG. 24 is version 1 of a side view illustrating an example of a point where the eye position of the target changes. FIG. 25 is version 2 of a side view illustrating an example of the point where the eye position of the target changes. FIG. 26 is version 3 of a side view illustrating an example of the point where the eye position of the target changes. FIG. 27 is version 4 of a side view illustrating an example of the point where the eye position of the target changes.

In the imaging system 10 according to the eleventh example embodiment, the periodicity estimation unit 120 estimates the periodicity by using the estimation model learned in advance. In particular, the estimation model used by the periodicity estimation unit 120 is learned in consideration of the change in the eye position of the target. More specifically, the estimation model is learned in consideration of the presence of a location where the eye position of the moving target 50 is likely to change, or the like.

Figure 24:
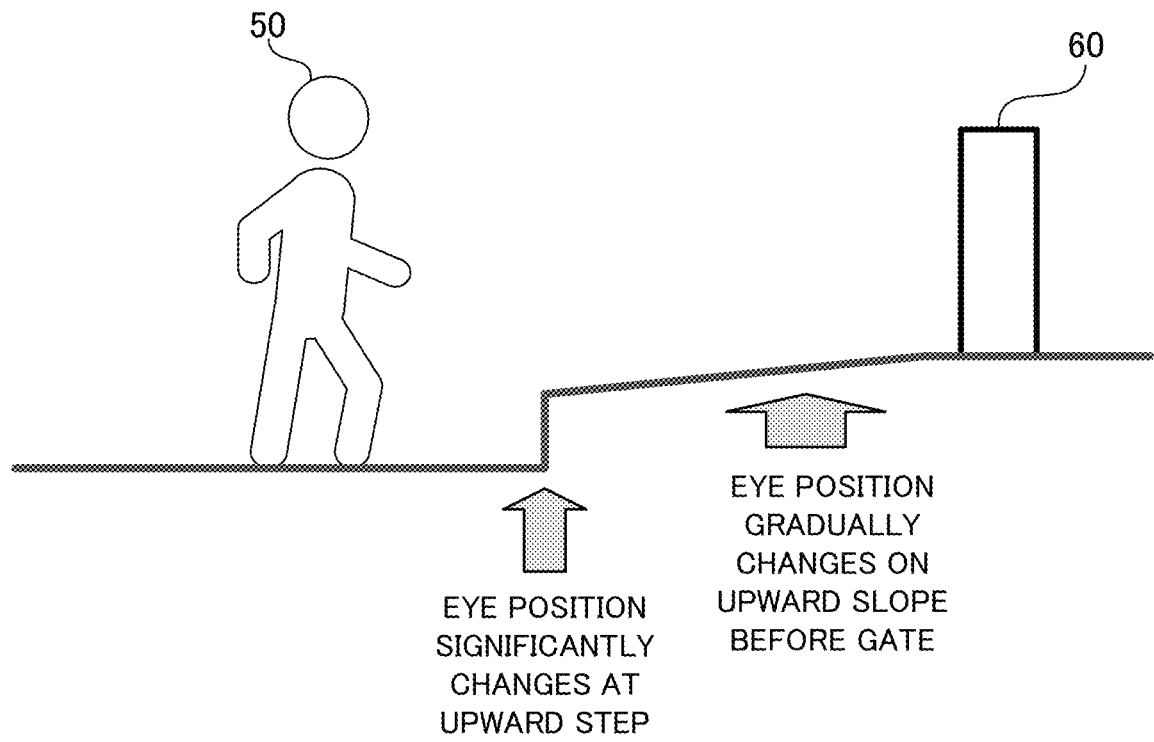
FIG. 24 is version 1 of a side view illustrating an example of a point where the eye position of the target changes.

As illustrated in FIG. 24, let us assume that there is an upward step and an upward slope on the moving path of the target 50. In this situation, the eye position of the target 50 is expected to significantly change upward (to become higher) at a point where there is the upward step. The eye position of the target 50 is also expected to gradually become higher on the upward slope before the gate 60.

As illustrated in FIG. 25, let us assume that there is a downward step and a downward slope on the moving path of the target 50. In this situation, the eye position of the target 50 is expected to significantly change downward (to become lower) at a point where there is the downward step. The eye position of the target 50 is also expected to gradually become lower on the downward slope before the gate 60.

As illustrated in FIG. 26, let us assume that there is an upward step and a downward slope on the moving path of the target 50. In this situation, the eye position of the target 50 is expected to significantly change upward (to become higher) at a point where there the upward step. The eye position of the target 50 is also expected to gradually become lower on the downward slope before the gate 60.

As illustrated in FIG. 27, let us assume that there is a downward step and an upward slope on the moving path of the target 50. In this situation, the eye position of the target 50 is expected to significantly change downward (to become lower) at a point where there is the downward step. The eye position of the target 50 is also expected to gradually become higher on the upward slope before the gate 60.

In this way, by acquiring in advance information about the location where the eye position of the target 50 may change, it is possible to learn the estimation model in consideration of the change in the eye position there. The periodicity estimation unit 120 may estimate the periodicity of the target and the eye position (eye level) at the focal position of the camera 18, by using the estimation model learned in consideration of the change in the eye position as described above. The combinations of the steps and the slopes illustrated in FIG. 24 to FIG. 27 are only exemplary, and the learning may be performed in consideration of another point where the eye position changes.

(Technical Effect)

Next, a technical effect obtained by the imaging system 10 according to the eleventh example embodiment will be described.

As described in FIG. 24, in the imaging system 10 according to the eleventh example embodiment, the estimation model is learned in consideration of the change in the eye position of the target 50. In this way, it is possible to estimate the periodicity in consideration of the change in the eye position of the target 50. Therefore, it is possible to estimate the periodicity about the movement of the target with higher accuracy than that in a case without consideration of the change in the eye position.

Twelfth Example Embodiment

The imaging system 10 according to a twelfth example embodiment will be described with reference to FIG. 28. The twelfth example embodiment is partially different from the first to eleventh example embodiments only in the operation, and may be the same as the first to eleventh example embodiments in the other parts. For this reason, a part that is different from each of the example embodiments described above will be described in detail below, and a description of other overlapping parts will be omitted as appropriate.

(Flow of Operation)

First, with reference to FIG. 28, a flow of operation of the imaging system 10 according to the twelfth example embodiment will be described. FIG. 28 is a flowchart illustrating the flow of the operation of the imaging system according to the twelfth example embodiment. In FIG. 28, the same steps as those illustrated in FIG. 7 carry the same reference numerals.

As illustrated in FIG. 28, when the operation of the imaging system 10 according to the twelfth example embodiment is started, first, the information acquisition unit 110 acquires the movement information about the movement of at least at a part of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on the focal plane of the camera 18, on the basis of the periodicity estimated by the periodicity estimation unit 120 (i.e., the periodicity indicated by the gait model) (step S401). Thereafter, the image acquisition unit 130 determines whether or not the target stops halfway (step S1101). Whether or not the target stops may be determined from the movement information acquired by the information acquisition unit 110, or may be determined from the image captured by the camera 18 or the like.

When it is determined that the target stops (the step S1101: YES), the image acquisition unit 130 acquires information about a stop position where the target stops and timing when the target starts to move again (step S1102). These pieces of information may be acquired through the information acquisition unit 110, for example.

Subsequently, the image acquisition unit 130 re-estimates the eye position on the focal plane of the camera 18 and adjusts imaging timing, on the basis of the acquired information about the stop position where the target stops and the timing when the target starts to move again (step S1103). In this case, the image acquisition unit 130 may estimate the imaging timing by using the estimation model and the periodicity until the target stops. That is, even in a case where the target stops and walks again, the imaging timing may be adjusted in consideration of the possibility that the target walks in a similar manner as that before stopping. Then, the image acquisition unit 130 controls the camera 18 in accordance with the eye position on the focal plane of the camera 18, and acquires the eye image of the target (step S402). When it is determined that target does not stop (the step S1101: NO), the steps S1101 and S1102 may be omitted.

(Technical Effect)

Next, a technical effect obtained by the imaging system 10 according to the twelfth example embodiment will be described.

As described in FIG. 28, in the imaging system 10 according to the twelfth example embodiment, in a case where the target stops, the eye position is re-estimated and the imaging timing is adjusted. In this way, even if the target unintentionally stops halfway (i.e., before the imaging), it is possible to properly acquire the image of the target by performing the adjustment after that.

Thirteenth Example Embodiment

The imaging system 10 according to a thirteenth example embodiment will be described with reference to FIG. 29 and FIG. 30. The thirteenth example embodiment is partially different from the first to twelfth example embodiments only the operation, and may be the same as the first to twelfth example embodiments in the other parts. For this reason, a part that is different from each of the example embodiments described above will be described in detail below, and a description of other overlapping parts will be omitted as appropriate.

(Flow of Operation)

First, with reference to FIG. 29 and FIG. 30, a flow of operation of the imaging system 10 according to the thirteenth example embodiment will be described. FIG. 29 is a flowchart illustrating the flow of the operation of the imaging system according to the thirteenth example embodiment. FIG. 30 is a graph illustrating an example of a maximum value, a minimum value, and a median of the eye level. In FIG. 29, the same steps as those illustrated in FIG. 28 carry the same reference numerals.

Figure 29:
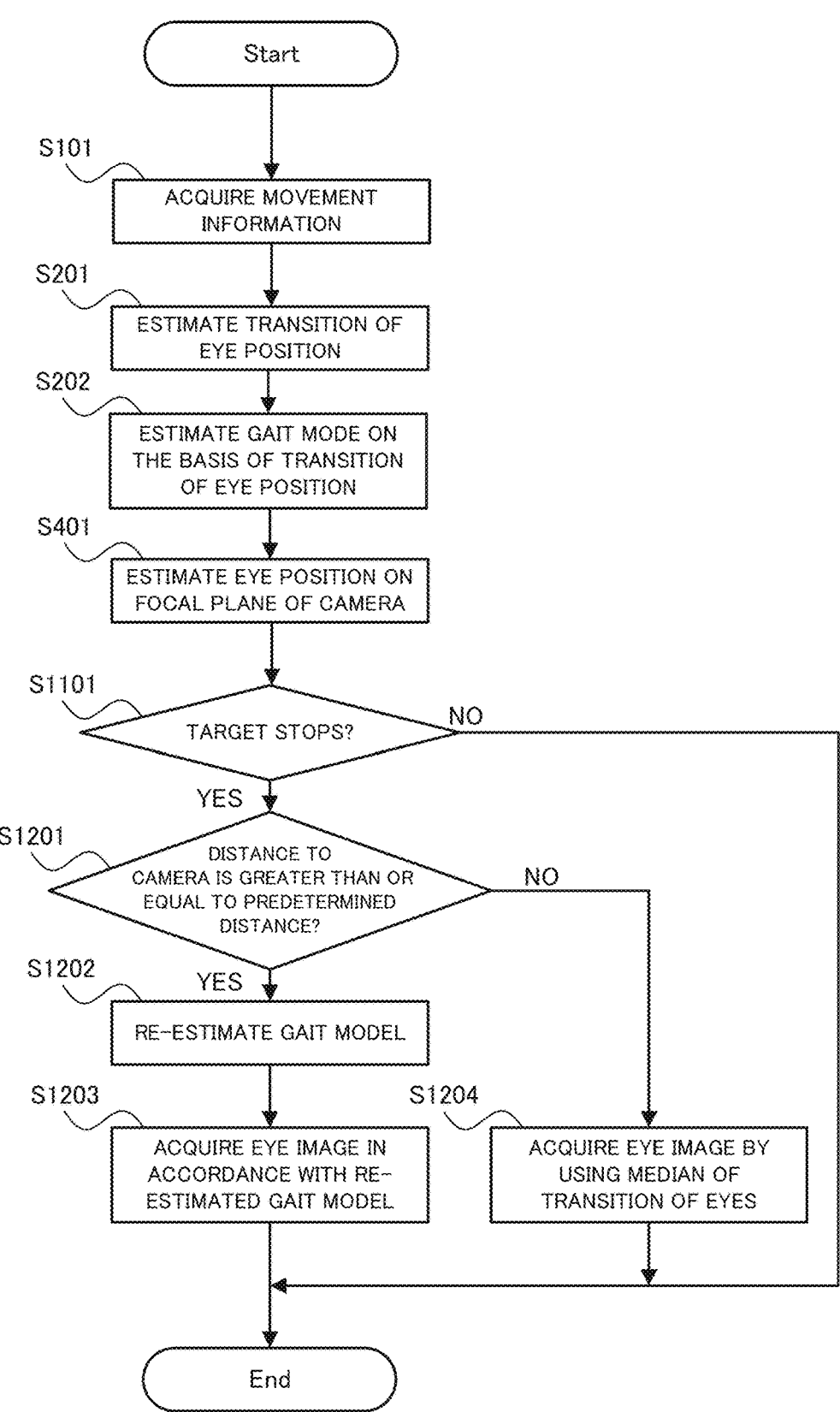
FIG. 29 is a flowchart illustrating a flow of operation of an imaging system according to a thirteenth example embodiment.

As illustrated in FIG. 29, when the operation of the imaging system 10 according to the thirteenth example embodiment is started, first, the information acquisition unit 110 acquires the movement information about the movement of at least at a part of the target (step S101). Subsequently, the periodicity estimation unit 120 estimates the transition of the eye position on the basis of the movement information acquired by the information acquisition unit 110 (step S201). Then, the periodicity estimation unit 120 estimates the gait model on the basis of the transition of the eye position (step S202).

Subsequently, the image acquisition unit 130 estimates the eye position on the focal plane of the camera 18, on the basis of the periodicity estimated by the periodicity estimation unit 120 (i.e., the periodicity indicated by the gait model) (step S401). Thereafter, the image acquisition unit 130 determines whether or not the target stops halfway (step S1101).

When it is determined that the target stops (the step S1101: YES), the image acquisition unit 130 determines whether or not a distance from the stop position where the target stops to the camera is greater than or equal to a predetermined distance (step S1201). The "predetermined distance" herein is a threshold for determining whether or not there is a sufficient time to re-estimate the gait model and to control the camera 18, from when the target stars to move again to when the imaging is performed. An appropriate value may be obtained and set in advance.

When the distance from the stop position where the target stops to the camera is greater than or equal to the predetermined distance (the step S1201: YES), the periodicity estimation unit 120 re-estimates the gait model of the target who restarts to move (step S1202). Then, the image acquisition unit 130 estimates the eye position from the re-estimated gait model, and acquires the eye image of the target (step S1203).

On the other hand, when the distance from the stop position where the target stops to the camera is not greater than the predetermined distance (the step S1201: NO), the image acquisition unit 130 acquires the eye image of the target, for example, in accordance with a median between a maximum value and a minimum value of the transition of the eye position (step S1203). For example, the image acquisition unit 130 may perform the imaging on the assumption that the eyes should be in a middle point of the highest point that is assumed to be the eye position and the lowest point that is assumed to be the eye position. More specifically, the image acquisition unit 130 may perform the imaging by setting, as a provisional eye position, a median ymedian between a maximum value ymax and a minimum ymin of the eye level in FIG. 30.

When it is determined that the target does not stop (the step S1101: NO), the steps S1201, S1203 and S1203 may be omitted.

(Technical Effect)

Next, a technical effect obtained by the imaging system 10 according to the thirteenth example embodiment will be described.

Figure 30:
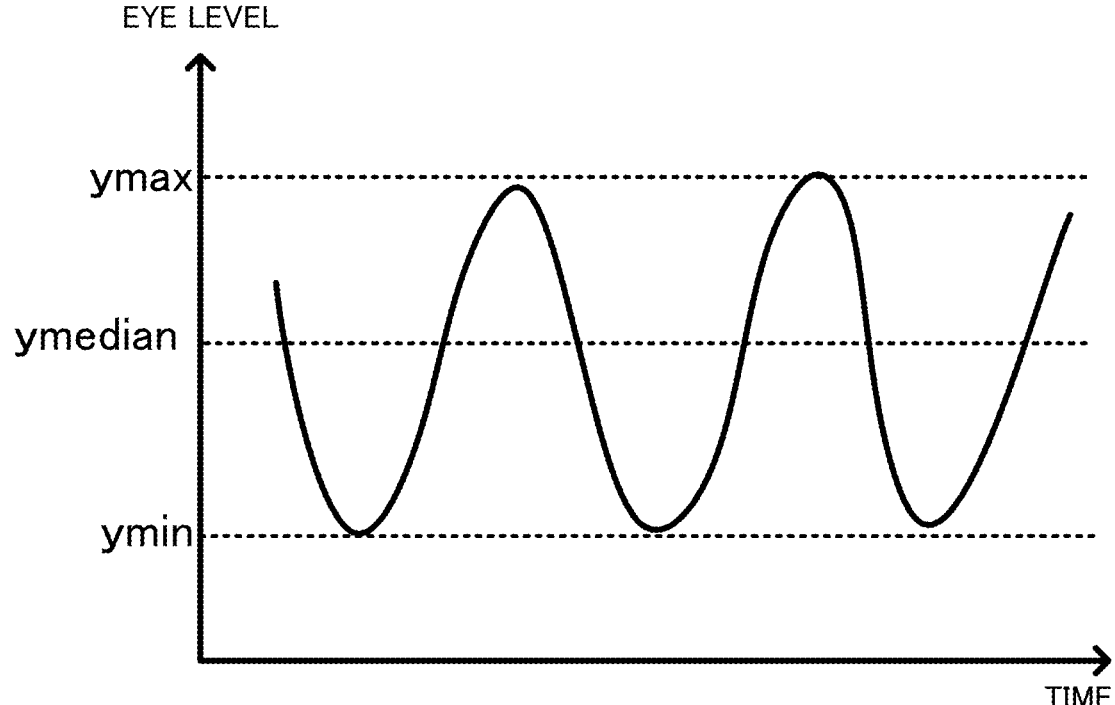
FIG. 30 is a graph illustrating an example of a maximum value, a minimum value, and a median of an eye level.

As described in FIG. 29 and FIG. 30, in the imaging system 10 according to the thirteenth example embodiment, different types of processing are performed in accordance with the stop position where the target stops. In this way, it is possible to perform appropriate imaging in accordance with the situation when the target stops. More specifically, since the gait model is re-estimated when the stop position is relatively far from the camera 18, it is possible to realize the imaging corresponding to the gait model newly estimated. On the other hand, when the stop position is relatively close to the camera 18, the imaging is performed in accordance with the median of the transition of the eyes. Therefore, even if the actual eye position is more or less shifted, it is possible to capture the image including the eyes with a higher probability.

Fourteenth Example Embodiment

The imaging system 10 according to a fourteenth example embodiment will be described with reference to FIG. 31. The fourteenth example embodiment is partially different from the first to thirteenth example embodiments only in the configuration and operation, and may be the same as the first to thirteenth example embodiments in the other parts. For this reason, apart that is different from each of the example embodiments described above will be described in detail below, and a description of other overlapping parts will be omitted as appropriate.

(Flow of Operation)

First, with reference to FIG. 31, a flow of operation of the imaging system 10 according to the fourteenth example embodiment will be described. FIG. 31 is a flowchart illustrating the flow of the operation of the imaging system according to the fourteenth example embodiment. In FIG. 31, the same steps as those illustrated in FIG. 3 carry the same reference numerals.

Figure 31:
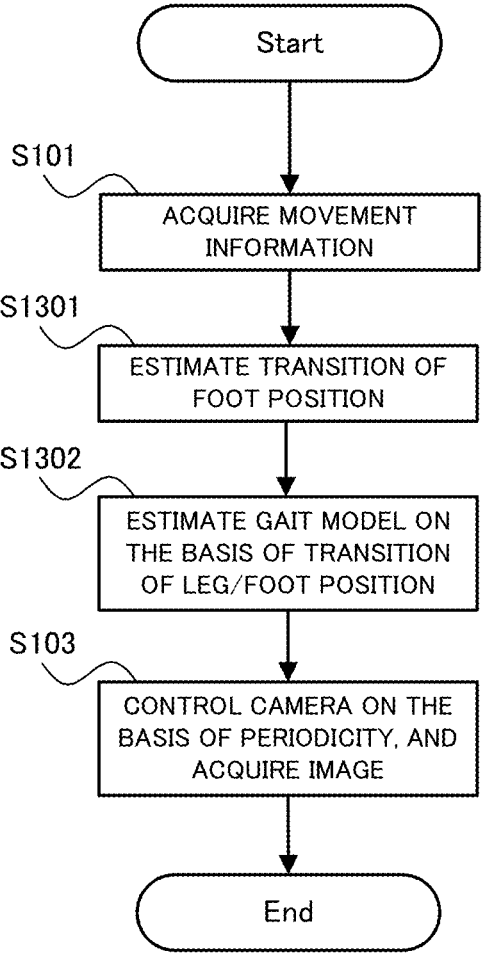
FIG. 31 is a flowchart illustrating a flow of operation of an imaging system according to a fourteenth example embodiment.

As illustrated in FIG. 31, when the operation of the imaging system 10 according to the fourteenth example embodiment is started, first, the information acquisition unit 110 acquires the movement information about the movement of at least a part of the target (step S101). The information acquisition unit 110 according to the fourteenth example embodiment acquires the movement information about at least a movement of legs/feet of the target.

Subsequently, the periodicity estimation unit 120 estimates a transition of a leg/foot position, on the basis of the movement information acquired by the information acquisition unit 110 (step S1301). Then, the periodicity estimation unit 120 estimates the gait model on the basis of the transition of the leg/foot position (step S1302). Then, the image acquisition unit 130 controls the camera 18 on the basis of the periodicity (i.e., the periodicity indicated by the gait model) estimated by the periodicity estimation unit 120, and acquires the image of the target (step S103).

The image acquisition unit 130 may change the imaging timing on the basis of a state of the legs/feet of the target. For example, the image acquisition unit 130 may perform the imaging at timing when both feet are on the ground (i.e., at timing when it can be determined that there is little phase shift due to the walking).

(Technical Effect)

Next, a technical effect obtained by the imaging system 10 according to the fourteenth example embodiment will be described.

As described in FIG. 31, according to the imaging system 10 in the fourteenth example embodiment, it is possible to perform more appropriate imaging in consideration of the movement of the legs/feet of the target.

Fifteenth Example Embodiment

The imaging apparatus according to a fifteenth example embodiment will be described with reference to FIG. 32. The fifteenth example embodiment is partially different from the first to fourteenth example embodiments only in the configuration and operation, and may be the same as the first to fourteenth example embodiments in the other parts. For this reason, a part that is different from each of the example embodiments described above will be described in detail below, and a description of other overlapping parts will be omitted as appropriate.

(Functional Configuration)

First, with reference to FIG. 32, a functional configuration of an imaging apparatus according to the fifteenth example embodiment will be described. FIG. 32 is a block diagram illustrating the functional configuration of the imaging apparatus according to the fifteenth example embodiment. In FIG. 32, the same components as those described in FIG. 2 carry the same reference numerals.

An imaging apparatus 500 according to the fifteenth example embodiment is configured to capture the image of the target. More specifically, the imaging apparatus 500 is configured to image a moving target (e.g., a pedestrian, etc.). The application of the image captured by imaging apparatus 500 is not particularly limited, but the image may be used in biometric authentication, for example. For example, the imaging apparatus 500 may be configured as a part of an authentication system that performs walk-through authentication in which a walking target is imaged to perform biometric authentication.

Figure 32:
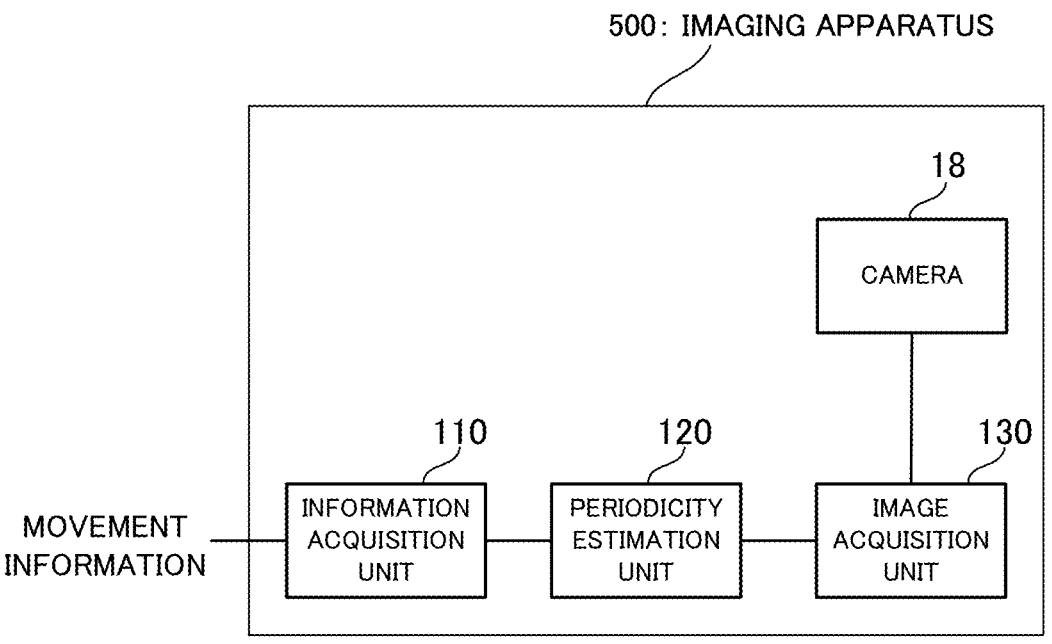
FIG. 32 is a block diagram illustrating a functional configuration of an imaging apparatus according to a fifteenth example embodiment.

As illustrated in FIG. 32, the imaging system 500 according to the fifteenth example embodiment includes, as components for realizing the functions thereof, the camera 18, the information acquisition unit 110, the periodicity estimation unit 120, and the image acquisition unit 130. That is, the imaging system 500 according to the fifteenth example embodiment includes the same components as those of the imaging system 10 according to the first example embodiment (see FIG. 2). Each of the acquisition unit 110, the periodicity estimation unit 120, and the image acquisition unit 130 may be a processing block realized or implemented by the processor 11 (see FIG. 1), for example.

(Technical Effect)

Next, a technical effect obtained by imaging apparatus 500 according to the fifteenth example embodiment will be described.

As described in FIG. 32, the imaging apparatus 500 according to the fifteenth example embodiment includes the functions of the imaging system 10 according to the first example embodiment, as a single apparatus. For this reason, the imaging apparatus 500 is capable of controlling the camera 18 on the basis of the periodicity about the movement of the target, as in the imaging system 10 described above. In this way, since the imaging may be performed in consideration of the movement of the target, it is possible to image the target in a more appropriate state and to acquire a more appropriate image.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

Supplementary Notes

The example embodiments described above may be further described as, but not limited to, the following Supplementary Notes below.

(Supplementary Note 1)

An imaging system according to Supplementary Note 1 is an imaging system including: an information acquisition unit that acquires movement information about a movement of at least a part of a target; a periodicity estimation unit that estimates periodicity about the movement of at least a part of the target, on the basis of the movement information; and an image acquisition unit that controls a camera for imaging the target on the basis of the periodicity and acquires an image of the target.

(Supplementary Note 2)

An imaging system according to Supplementary Note 2 is the imaging system according to Supplementary Note 1, wherein the periodicity estimation unit estimates a transition of an eye position of the target in a three-dimensional space, and estimates a gait model of the target indicating the periodicity on the basis of the transition of the eye position of the target.

(Supplementary Note 3)

An imaging system according to Supplementary Note 3 is the imaging system according to Supplementary Note 2, wherein the information acquisition unit acquires the movement information about a movement of eyes of the target by using an eye position detection camera, and the periodicity estimation unit converts a transition of the eye position of the target in a two-dimensional plane to the transition of the eye position of the target in the three-dimensional space, by using a distance between the target and the eye position detection camera.

(Supplementary Note 4)

An imaging system according to Supplementary Note 4 is the imaging system according to Supplementary Note 2 or 3, wherein the image acquisition unit estimates the eye position of the target on a focal plane of the camera on the bas the gait model, changes an imaging range of the camera in accordance with the eye position of the target, and acquires an eye image of the target.

(Supplementary Note 5)

An imaging system according to Supplementary Note 5 is the imaging system according to Supplementary Note 4, wherein the image acquisition unit moves the camera to a first position where the estimated eye position of the target on the focal plane of the camera is included in the imaging range, and then moves the camera to a second position where an actual eye position of the target is included in the imaging range.

(Supplementary Note 6)

An imaging system according to Supplementary Note 6 is the imaging system according to Supplementary Note 4, wherein a plurality of cameras are provided, and the image acquisition unit selects to use a first camera in which the estimated eye position of the target on the focal plane of the camera is included in the imaging range, and then selects to use a second camera in which an actual eye position of the target is included in the imaging range.

(Supplementary Note 7)

An imaging system according to Supplementary Note 7 is the imaging system according to Supplementary Note 4, wherein the camera includes a mirror that allows the imaging range to be adjusted, and the image acquisition unit controls the mirror such that the estimated eye position of the target on the focal plane of the camera is included in the imaging range, and then controls the mirror such that an actual eye position of the target is included in the imaging range.

(Supplementary Note 8)

An imaging system according to Supplementary Note 8 is the imaging system according to any one of Supplementary Notes 2 to 7, wherein the image acquisition unit performs at least one of a control of increasing irradiation light quantity applied to the target and a control of shortening an exposure time of the camera, in a case where the eye position of the target on the focal plane of the camera is a position where an amount of change in the eye position per unit time in the gait model is greater than a predetermined value.

(Supplementary Note 9)

An imaging system according to Supplementary Note 9 is the imaging system according to any one of Supplementary Notes 1 to 8, wherein the periodicity estimation unit includes a plurality of estimation models learned for at least one element of a state of the target, a situation of the target, and a surrounding environment, and estimates the periodicity by switching the plurality of estimation models in accordance with the at least one element of the state of the target, the situation of the target, and the surrounding environment.

(Supplementary Note 10)

An imaging system according to Supplementary Note 10 is the imaging system according to any one of Supplementary Notes 1 to 9, wherein the periodicity estimation unit estimates the periodicity by using an estimation model learned in consideration of deceleration of the target due to an imaging environment.

(Supplementary Note 11)

An imaging system according to Supplementary Note 11 is the imaging system according to any one of Supplementary Notes 4 to 10, wherein in a case where the movement of the target stops, the image acquisition unit corrects the eye position of the target on the focal plane of the camera and imaging timing of the camera, on the basis of a distance between a stop position where the movement stops and the camera, and timing when the target starts to move again.

(Supplementary Note 12)

An imaging system according to Supplementary Note 12 is the imaging system according to any one of Supplementary Notes 4 to 11, wherein in a case where the movement of the target stops, the image acquisition unit re-estimates the gait model when a distance between a stop position where the movement stops and the camera is greater than or equal to a predetermined distance, and performs imaging in accordance with a position of a median between a maximum value and a minimum value in a transition of the eye position of the target when the distance is less than the predetermined distance.

(Supplementary Note 13)

An imaging system according to Supplementary Note 13 is the imaging system according to Supplementary Note 1, wherein the periodicity estimation unit estimates a transition of a leg/foot position of the target in a three-dimensional space, and estimates a gait model of the target indicating the periodicity on the basis of the transition of the leg/foot position of the target.

(Supplementary Note 14)

An imaging apparatus according to Supplementary Note 14 is an imaging apparatus including: an information acquisition unit that acquires movement information about a movement of at least a part of a target; a periodicity estimation unit that estimates periodicity about the movement of at least a part of the target, on the basis of the movement information; and an image acquisition unit that controls a camera for imaging the target on the basis of the periodicity and acquires an image of the target.

(Supplementary Note 15)

An imaging method according to Supplementary Note 15 is an imaging method that is executed by at least one computer, the imaging method including: acquiring movement information about a movement of at least a part of a target; estimating periodicity about the movement of at least a part of the target, on the basis of the movement information; and controlling a camera for imaging the target on the basis of the periodicity and acquiring an image of the target.
(Supplementary Note 16)

A recording medium according to Supplementary Note 16 is a recording medium on which a computer program that allows at least one computer to execute an imaging method is recorded, the imaging method including: acquiring movement information about a movement of at least a part of a target; estimating periodicity about the movement of at least a part of the target, on the basis of the movement information; and controlling a camera for imaging the target on the basis of the periodicity and acquiring an image of the target.
(Supplementary Note 17)

A computer program according to Supplementary Note 17 is a computer program that allows at least one computer to execute an imaging method, the imaging method including: acquiring movement information about a movement of at least a part of a target; estimating periodicity about the movement of at least a part of the target, on the basis of the movement information; and controlling a camera for imaging the target on the basis of the periodicity and acquiring an image of the target.

This disclosure is not limited to the examples described above and is allowed to be changed, if desired, without departing from the essence or spirit of this disclosure which can be read from the claims and the entire specification. An imaging system, an imaging apparatus, an imaging method, and a recording medium with such changes are also intended to be within the technical scope of this disclosure.

DESCRIPTION OF REFERENCE CODES

10 Imaging system
11 Processor
18 Camera
20 Eye position detection camera
21 Distance sensor
50 Target
60 Gate
110 Information acquisition unit
120 Periodicity estimation unit
130 Image acquisition unit
300 Mirror
500 Imaging apparatus

What is claimed is:

1. An imaging system comprising:
at least one memory that is configured to store instructions; and
at least one processor that is configured to execute the instructions to:
acquire movement information about a movement of at least a part of a target;
estimate periodicity about the movement of at least a part of the target, on the basis of the movement information; and
control a camera for imaging the target on the basis of the periodicity and acquire an image of the target,
wherein the at least one processor is configured to execute the instructions to estimate a transition of an eye position of the target in a three-dimensional space, and estimate a gait model of the target indicating the periodicity on the basis of the transition of the eye position of the target,

wherein the at least one processor is configured to execute the instructions to perform at least one of a control of increasing irradiation light quantity applied to the target and a control of shortening an exposure time of the camera, in a case where the eye position of the target on a focal plane of the camera is a position where an amount of change in the eye position per unit time in the gait model is greater than a predetermined value,
wherein the at least one processor is configured to execute the instructions to estimate the eye position of the target on the focal plane of the camera on the basis of the gait model, change an imaging range of the camera in accordance with the eye position of the target, and acquire an eye image of the target, and
wherein in a case where the movement of the target stops, the at least one processor is configured to execute the instructions to re-estimate the gait model when a distance between a stop position where the movement stops and the camera is greater than or equal to a predetermined distance, and perform imaging in accordance with a position of a median between a maximum value and a minimum value in a transition of the eye position of the target when the distance is less than the predetermined distance.

2. The imaging system according to claim 1, wherein the at least one processor is configured to execute the instructions to
acquire the movement information about a movement of eyes of the target by using an eye position detection camera, and
convert a transition of the eye position of the target in a two-dimensional plane to the transition of the eye position of the target in the three-dimensional space, by using a distance between the target and the eye position detection camera.

3. The imaging system according to claim 1, wherein the at least one processor is configured to execute the instructions to move the camera to a first position where the estimated eye position of the target on the focal plane of the camera is included in the imaging range, and then move the camera to a second position where an actual eye position of the target is included in the imaging range.

4. The imaging system according to claim 1, wherein
a plurality of cameras are provided, and
the at least one processor is configured to execute the instructions to select to use a first camera in which the estimated eye position of the target on the focal plane of the camera is included in the imaging range, and then select to use a second camera in which an actual eye position of the target is included in the imaging range.

5. The imaging system according to claim 1, wherein
the camera includes a mirror that allows the imaging range to be adjusted, and
the at least one processor is configured to execute the instructions to control the mirror such that the estimated eye position of the target on the focal plane of the camera is included in the imaging range, and then control the mirror such that an actual eye position of the target is included in the imaging range.

6. The imaging system according to claim 1, wherein the at least one processor is configured to execute the instructions to include a plurality of estimation models learned for at least one element of a state of the target, a situation of the target, and a surrounding environment, and estimate the periodicity by switching the plurality of estimation models in accordance with the at least one element of the state of the target, the situation of the target, and the surrounding environment.

7. The imaging system according to claim 1, wherein the at least one processor is configured to execute the instructions to estimate the periodicity by using an estimation model learned in consideration of deceleration of the target due to an imaging environment.

8. The imaging system according to claim 1, wherein in a case where the movement of the target stops, the at least one processor is configured to execute the instructions to correct the eye position of the target on the focal plane of the camera and imaging timing of the camera, on the basis of the distance between the stop position where the movement stops and the camera, and timing when the target starts to move again.

9. The imaging system according to claim 1, wherein the at least one processor is configured to execute the instructions to estimate a transition of a leg/foot position of the target in a three-dimensional space, and estimate the gait model of the target indicating the periodicity on the basis of the transition of the leg/foot position of the target.

10. An imaging method that is executed by at least one computer, the imaging method comprising:

acquiring movement information about a movement of at least a part of a target;

estimating periodicity about the movement of at least a part of the target, on the basis of the movement information; and controlling a camera for imaging the target on the basis of the periodicity and acquiring an image of the target, wherein the imaging method further comprises:

estimating a transition of an eye position of the target in a three-dimensional space, and estimating a gait model of the target indicating the periodicity on the basis of the transition of the eye position of the target, and performing at least one of a control of increasing irradiation light quantity applied to the target and a control of shortening an exposure time of the camera, in a case where the eye position of the target on a focal plane of the camera is a position where an amount of change in the eye position per unit time in the gait model is greater than a predetermined value, and wherein the imaging method further comprises:

estimating the eye position of the target on the focal plane of the camera on the basis of the gait model, changing an imaging range of the camera in accordance with the eye position of the target, and acquiring an eye image of the target, and in a case where the movement of the target stops, re-estimating the gait model when a distance between a stop position where the movement stops and the camera is greater than or equal to a predetermined distance, and performing imaging in accordance with a position of a median between a maximum value and a minimum value in a transition of the eye position of the target when the distance is less than the predetermined distance.

11. A non-transitory recording medium on which a computer program that allows at least one computer to execute an imaging method is recorded, the imaging method including:

acquiring movement information about a movement of at least a part of a target;

estimating periodicity about the movement of at least a part of the target, on the basis of the movement information; and controlling a camera for imaging the target on the basis of the periodicity and acquiring an image of the target, wherein the imaging method further comprises:

estimating a transition of an eye position of the target in a three-dimensional space, and estimating a gait model of the target indicating the periodicity on the basis of the transition of the eye position of the target, and performing at least one of a control of increasing irradiation light quantity applied to the target and a control of shortening an exposure time of the camera, in a case where the eye position of the target on a focal plane of the camera is a position where an amount of change in the eye position per unit time in the gait model is greater than a predetermined value, and wherein the imaging method further comprises:

estimating the eye position of the target on the focal plane of the camera on the basis of the gait model, changing an imaging range of the camera in accordance with the eye position of the target, and acquiring an eye image of the target, and in a case where the movement of the target stops, re-estimating the gait model when a distance between a stop position where the movement stops and the camera is greater than or equal to a predetermined distance, and performing imaging in accordance with a position of a median between a maximum value and a minimum value in a transition of the eye position of the target when the distance is less than the predetermined distance.

\* \* \* \* \*